United States Patent
Yu et al.

(10) Patent No.: US 10,904,120 B2
(45) Date of Patent: **\*Jan. 26, 2021**

(54) METHOD, BASE STATION, AND USER EQUIPMENT FOR DETERMINING CHANNEL LOSS

(71) Applicant: HUAWEI TECHNOLOGIES CO., LTD., Guangdong (CN)

(72) Inventors: Zheng Yu, Beijing (CN); Fang Nan, Shenzhen (CN); Ningbo Zhang, Shenzhen (CN); Xingqing Cheng, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/586,991

(22) Filed: Sep. 29, 2019

(65) Prior Publication Data

US 2020/0028766 A1    Jan. 23, 2020

Related U.S. Application Data

(63) Continuation of application No. 15/965,853, filed on Apr. 28, 2018, now Pat. No. 10,447,563, which is a (Continued)

(51) Int. Cl.
*H04L 12/26* (2006.01)
*H04B 17/309* (2015.01)
(Continued)

(52) U.S. Cl.
CPC ....... *H04L 43/0835* (2013.01); *H04B 17/309* (2015.01); *H04W 24/08* (2013.01); *H04W 72/085* (2013.01)

(58) Field of Classification Search
CPC .......... H04L 43/0835; H04L 43/0829; H04B 17/309; H04B 17/318; H04B 17/327;
(Continued)

(56) References Cited

U.S. PATENT DOCUMENTS

| 7,218,950 B2 | 5/2007 | Qiu et al. |
| 7,706,824 B2 | 4/2010 | Schulist et al. |

(Continued)

FOREIGN PATENT DOCUMENTS

| CN | 101801077 A | 8/2010 |
| CN | 101998487 A | 3/2011 |

(Continued)

OTHER PUBLICATIONS

3GPP TS 36.101 V11.2.0 (Sep. 2012);3rd Generation Partnership Project;Technical Specification Group Radio Access Network;Evolved Universal Terrestrial Radio Access (E-UTRA);User Equipment (UE) radio transmission and reception (Release 11) ;total 359 pages.
(Continued)

*Primary Examiner* — Candal Elpenord
(74) *Attorney, Agent, or Firm* — Huawei Technologies Co., Ltd.

(57) ABSTRACT

The application pertains to determining a rank of channel loss extent. A base station sends to a terminal a signaling indicating that there are N ranks of channel loss extent. Each rank has a corresponding number of random access preamble repetitions. The base station receives from the terminal device one or more transmissions of a random access preamble in a first number of repetitions of the random access preamble. The base station determines the rank of channel loss extent according to a random access preamble group in which the received random access preamble is located, or the first number of repetitions of the received random access preamble. A channel loss is a reference signal
(Continued)

received power (RSRP). After determining the rank of channel loss extent, the base station determines a second number of repetitions corresponding to the determined rank of channel loss extent, for sending or receiving uplink/downlink information.

19 Claims, 5 Drawing Sheets

Related U.S. Application Data continuation of application No. 14/701,295, filed on Apr. 30, 2015, now Pat. No. 10,003,513, which is a continuation of application No. PCT/CN2012/083998, filed on Nov. 2, 2012.

(51) Int. Cl.
*H04W 24/08* (2009.01)
*H04W 72/08* (2009.01)

(58) Field of Classification Search
CPC .... H04B 17/336; H04W 24/02; H04W 24/04; H04W 24/08; H04W 24/10
See application file for complete search history.

(56) References Cited

U.S. PATENT DOCUMENTS

| 8,095,143 | B2 | 1/2012 | Amirijoo et al. |
|---|---|---|---|
| 8,102,804 | B2 | 1/2012 | Noh et al. |
| 8,873,406 | B2 | 10/2014 | Jeong et al. |
| 10,142,962 | B2 | 11/2018 | Lee et al. |
| 2009/0042582 | A1 | 2/2009 | Wang et al. |
| 2009/0190528 | A1 | 7/2009 | Chung et al. |
| 2009/0233616 | A1 | 9/2009 | Kwon et al. |
| 2009/0268666 | A1 | 10/2009 | Vujcic |
| 2010/0020712 | A1 | 1/2010 | Lee et al. |
| 2010/0067443 | A1 | 3/2010 | Luo et al. |
| 2010/0278114 | A1 | 11/2010 | Kwon et al. |
| 2011/0292816 | A1 | 12/2011 | Lee et al. |
| 2011/0299492 | A1 | 12/2011 | Lee et al. |
| 2012/0307648 | A1 | 12/2012 | Okubo et al. |
| 2013/0077582 | A1 | 3/2013 | Kim et al. |
| 2013/0083753 | A1 | 4/2013 | Lee et al. |
| 2013/0223235 | A1 | 8/2013 | Hu et al. |
| 2013/0301542 | A1 | 11/2013 | Krishnamurthy et al. |
| 2014/0098761 | A1* | 4/2014 | Lee ................ H04W 24/02 370/329 |

FOREIGN PATENT DOCUMENTS

| CN | 102202412 A | 9/2011 |
|---|---|---|
| CN | 102204386 A | 9/2011 |
| CN | 102264095 A | 11/2011 |
| CN | 102281571 A | 12/2011 |
| CN | 102316481 A | 1/2012 |
| CN | 102316573 A | 1/2012 |
| CN | 102523626 A | 6/2012 |
| EP | 1176739 A1 | 1/2002 |
| EP | 1916863 A2 | 4/2008 |
| EP | 2030394 A2 | 3/2009 |
| EP | 2176966 A1 | 4/2010 |
| EP | 2092660 B1 | 8/2012 |
| KR | 20090076784 A | 7/2009 |
| WO | 2007142492 A2 | 12/2007 |
| WO | 2009020292 A1 | 2/2009 |
| WO | 2012115445 A2 | 8/2012 |

OTHER PUBLICATIONS

3GPP TS 36.212 V11.0.0 (Sep. 2012);3rd Generation Partnership Project;Technical Specification Group Radio Access Network;Evolved Universal Terrestrial Radio Access (E-UTRA);Multiplexing and channel coding(Release 11);total 79 pages.

3GPP TS 36.300 V11.3.0 (Sep. 2012);3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 11);total 205 pages.

3GPP TS 36.304 V11.1.0 (Sep. 2012);3rd Generation Partnership Project;Technical Specification Group Radio Access Network;Evolved Universal Terrestrial Radio Access (E-UTRA); User Equipment (UE) procedures in idle mode (Release 11);total 33 pages.

3GPP TS 36.355 V11.0.0 (Sep. 2012);3rd Generation Partnership Project;Technical Specification Group Radio Access Network;Evolved Universal Terrestrial Radio Access (E-UTRA) );LTE Positioning Protocol (LPP)(Release 11);total 117 pages.

3GPP TS 36.413 V11.1.0 (Sep. 2012);3rd Generation Partnership Project;Technical Specification Group Radio Access Network;Evolved Universal Terrestrial Radio Access (E-UTRA);S1 Application Protocol (S1AP)(Release 11); total 262 pages.

Lucent Technologies,"RACH in Support of High-Speed UEs",3GPP TSG-RAN WG1 #46 R1-062387,Tallinn, Estonia, Aug. 28-Sep. 1, 2006,total 9 pages.

LG Electronics,"RACH Design under Frequency Offset",3GPP TSG RAN WG1 Meeting #47 R1-063162,Riga, Latvia, Nov. 6-Nov. 10, 2006,total 7 pages.

LG Electronics,"Multi-TTI RACH Preamble Design",3GPP TSG RAN WG1 Meeting #48 R1-070905,St. Louis, USA Feb. 12-Feb. 16, 2007,total 4 pages.

Texas Instruments Inc,"Non Synchronized Random Access Procedure in E-UTRA",3GPP TSG RAN WG1 #47 R1-063212,Riga, Latvia, Nov. 6-10, 2006,total 5 pages.

3GPP TS 36.213 V11.0.0 (Sep. 2012);3rd Generation Partnership Project;Technical Specification Group Radio Access Network;Evolved Universal Terrestrial Radio Access (E-UTRA);Physical layer procedures(Release 11),total 143 pages.

3GPP TS 36.331 V11.1.0 (Sep. 2012);3rd Generation Partnership Project;Technical Specification Group Radio Access Network;Evolved Universal Terrestrial Radio Access (E-UTRA);Radio Resource Control (RRC);Protocol specification (Release 11),total 325 pages.

3GPP TS 36.321 V11.0.0 (Sep. 2012);3rd Generation Partnership Project;Technical Specification Group Radio Access Network;Evolved Universal Terrestrial Radio Access (E-UTRA);Medium Access Control (MAC) protocol specification (Release 11),total 55 pages.

3GPP TS 36.211 V11.0.0 (Sep. 2012);3rd Generation Partnership Project;Technical Specification Group Radio Access Network;Evolved Universal Terrestrial Radio Access (E-UTRA);Physical Channels and Modulation(Release 11),total 106 pages.

3GPP TS 36.213 V10.0.1 (Dec. 2010), 3rd Generation Partnership Project; Technical Specification Group Radio Access Network; Evolved Universal Terrestrial Radio Access (E-UTRA); Physical layer procedures(Release 10), total 98 pages.

* cited by examiner

METHOD, BASE STATION, AND USER EQUIPMENT FOR DETERMINING CHANNEL LOSS

CROSS REFERENCE TO RELATED APPLICATIONS

This application is a continuation of U.S. patent application Ser. No. 15/965,853, filed on Apr. 28, 2018, which is a continuation of U.S. patent application Ser. No. 14/701,295, filed on Apr. 30, 2015, now U.S. Pat. No. 10,003,513. U.S. patent application Ser. No. 14/701,295 is a continuation of International Application No. PCT/CN2012/083998, filed on Nov. 2, 2012. All of the afore-mentioned patent applications are hereby incorporated by reference in their entireties.

TECHNICAL FIELD

The present application relates to the field of communications, and, in particular, to a method, a base station, and a user equipment device for determining channel loss.

BACKGROUND

The Internet of Things (IoT) is a network for implementing interconnection and interworking of human to machine and machine to machine (M2M). The 3rd Generation Partnership Project (3GPP) has set up special project teams to study low-cost machine type communication (MTC) based on long term evolution (LTE), where the communication type can be used in the Internet of Things.

The study on the low-cost MTC mainly considers enhancement or optimization that needs to be performed on an LTE network and an air interface with regard to introduction of an MTC device, where a coverage problem is one of key problems concerned by operators. An important application of an MTC terminal (also called user equipment, UE for short) is a smart meter. For example, the MTC terminal can be used to automatically read water, electricity, gas and other metering information and report the metering information to a data center. Generally, this kind of smart meter is installed in a basement of a house, isolated by a metal enclosure, or installed in an old-fashioned building with thick walls. In this case, path loss between an MTC UE and a base station is extremely severe, and the quality of communications between the base station and the MTC UE is relatively poor.

By taking cost and spectrum factors into account, operators do not want to add a new site and relay device. Therefore, the operators impose a new requirement, expecting that when an LTE system provides a service for an MTC UE, coverage of the LTE system needs to be enhanced by 20 dB compared to an existing LTE system.

SUMMARY

Embodiments of the present application provide a method, a base station, and a user equipment for determining channel loss, so as to solve a problem that a base station cannot learn channel loss of a UE in the prior art.

In a first aspect, a method for determining channel loss is provided and includes: receiving first information that is from a first user equipment (UE) and corresponds to a rank of a channel loss extent of the first UE; and determining the rank of the channel loss extent of the first UE according to the first information.

In a first possible implementation manner of the first aspect, the receiving first information that is from a first user equipment (UE) and corresponds to a rank of a channel loss extent of the first UE includes:
receiving the first information according to correspondence between the rank of the channel loss extent and a transmission type of the first information.

With reference to any one of the foregoing possible implementation manners, in a second possible implementation manner of the first aspect, the first information is a random access preamble, and the determining the rank of the channel loss extent of the first UE according to the first information includes:
determining a random access preamble group in which the first information is located, and determining the rank of the channel loss extent of the first UE according to correspondence between the random access preamble group and the rank of the channel loss extent; or
determining the rank of the channel loss extent of the first UE according to the correspondence between the transmission type of the first information and the rank of the channel loss extent.

With reference to any one of the foregoing possible implementation manners, in a third possible implementation manner of the first aspect, the random access preamble is a random access preamble in a random access preamble group among N random access preamble groups that are determined for the first UE, where N is a positive integer, and
all random access preambles included in the N random access preamble groups are random access preambles all used for contention; or
the first UE is a machine type communications (MTC) UE, and all random access preambles included in the N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

With reference to any one of the foregoing possible implementation manners, in a fourth possible implementation manner of the first aspect, that all random access preambles included in the N random access preamble groups are random access preambles all used for contention includes that:
one random access preamble group among the N random access preamble groups includes all random access preambles in the random access preamble group A and the random access preamble group B; or
one random access preamble group among the N random access preamble groups is the random access preamble group A, and another random access preamble group is the random access preamble group B.

With reference to any one of the foregoing possible implementation manners, in a fifth possible implementation manner of the first aspect, before the receiving first information that is from a first user equipment (UE) and corresponds to a rank of a channel loss extent of the first UE, the method further includes: informing configuration of the N random access preamble groups to the first UE by using one or more of the following kinds of signaling: radio resource control (RRC) common signaling, RRC dedicated signaling, media access control (MAC) control element (CE) signaling, and physical-layer signaling; or configuration of the N random access preamble groups is predetermined, where the configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

With reference to any one of the foregoing possible implementation manners, in a sixth possible implementation manner of the first aspect, before the receiving first information that is from a first user equipment (UE) and corresponds to a rank of a channel loss extent of the first UE, the method further includes: informing the transmission type of the first information to the first UE by using one or more of the following kinds of signaling: RRC common signaling, RRC dedicated signaling, MAC CE signaling, and physical-layer signaling; or the transmission type of the first information is predefined.

With reference to any one of the foregoing possible implementation manners, in a seventh possible implementation manner of the first aspect, in the case in which the rank of the channel loss extent of the first UE is determined according to the correspondence between the transmission type of the first information and the rank of the channel loss extent, time and/or frequency resource locations of enhanced random access opportunities corresponding to different transmission types of the first information do not overlap each other.

With reference to any one of the foregoing possible implementation manners, in an eighth possible implementation manner of the first aspect, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

With reference to any one of the foregoing possible implementation manners, in a ninth possible implementation manner of the first aspect, the transmission type of the first information includes one or more of the following kinds: a spreading sequence index, a random access preamble format, and power configuration, where the transmission type of the first information corresponds to the rank of the channel loss extent.

With reference to any one of the foregoing possible implementation manners, in a tenth possible implementation manner of the first aspect, after the receiving the first information according to correspondence between the rank of the channel loss extent and a transmission type of the first information, the method further includes: combining the first information according to the repeating factor M that corresponds to the transmission type of the first information, and detecting the combined first information by using a sequence in a predetermined set; or despreading the first information according to the spreading factor M that corresponds to the transmission type of the first information, and detecting the despread first information by using a sequence in a predetermined set.

With reference to any one of the foregoing possible implementation manners, in an eleventh possible implementation manner of the first aspect, before the receiving first information that is from a first user equipment (UE) and corresponds to a rank of a channel loss extent of the first UE, the method further includes: informing classification information about classifying channel loss extents into N ranks to the first UE by using one or more of the following kinds of signaling: RRC common signaling, RRC dedicated signaling, MAC CE signaling, and physical-layer signaling; or N ranks of channel loss extents are determined according to a predefined rule.

With reference to any one of the foregoing possible implementation manners, in a twelfth possible implementation manner of the first aspect, the classification information includes: a parameter that is used to indicate a value of N and/or a threshold parameter that is used to determine the N ranks.

With reference to any one of the foregoing possible implementation manners, in a thirteenth possible implementation manner of the first aspect, the receiving first information that is from a first user equipment (UE) and corresponds to a rank of a channel loss extent of the first UE includes: receiving the first information that is from the first UE and is conveyed by a neighboring base station, where the neighboring base station is a serving base station of the first UE; and/or after the receiving first information that is from a first user equipment (UE) and corresponds to a rank of a channel loss extent of the first UE, the method further includes: sending the first information or the determined rank of the channel loss extent of the first UE to a neighboring base station.

With reference to any one of the foregoing possible implementation manners, in a fourteenth possible implementation manner of the first aspect, after the receiving the first information that is from the first UE and is conveyed by a neighboring base station, the method further includes: determining the rank of the channel loss extent of the first UE according to the first information, and configuring random access preamble information corresponding to the rank of the channel loss extent of the first UE; informing the neighboring base station of the configured random access preamble information, so that the neighboring base station sends the configured random access preamble information to the first UE; and receiving a random access preamble that is sent by the first UE and indicated by the configured random access preamble information.

With reference to any one of the foregoing possible implementation manners, in a fifteenth possible implementation manner of the first aspect, after the sending the first information or the determined rank of the channel loss extent of the first UE to a neighboring base station, the method further includes: receiving random access preamble information sent by the neighboring base station; and sending the received random access preamble information to the first UE.

With reference to any one of the foregoing possible implementation manners, in a sixteenth possible implementation manner of the first aspect, the random access preamble information includes one or more of the following kinds of parameters: a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

With reference to any one of the foregoing possible implementation manners, in a seventeenth possible implementation manner of the first aspect, after the receiving a random access preamble that is sent by the first UE and indicated by the configured random access preamble information, the method includes: combining the random access preamble according to the repeating factor M, and detecting the combined random access preamble; or despreading the random access preamble according to the spreading factor M, and detecting the despread random access preamble.

With reference to any one of the foregoing possible implementation manners, in an eighteenth possible implementation manner of the first aspect, after the determining the rank of the channel loss extent of the first UE according to the first information, the method further includes:

sending and/or receiving third information according to a transmission type of the third information, where the transmission type of the third information corresponds to the determined rank of the channel loss extent of the first UE.

With reference to any one of the foregoing possible implementation manners, in a nineteenth possible implementation manner of the first aspect, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

With reference to any one of the foregoing possible implementation manners, in a twentieth possible implementation manner of the first aspect, transmission types of at least two kinds of third information are different; or all kinds of third information have a same transmission type.

With reference to any one of the foregoing possible implementation manners, in a twenty-first possible implementation manner of the first aspect, before the third information is transmitted, the transmission type of the third information is informed to the first UE by using one or more of the following kinds of signaling: radio resource control (RRC) common signaling, RRC dedicated signaling, media access control (MAC) control element (CE) signaling, and physical-layer signaling; or the transmission type of the third information is predetermined; or before the third information is transmitted, the transmission type of the third information is transmitted to the first UE by using a random access response message and/or a contention resolution message.

With reference to any one of the foregoing possible implementation manners, in a twenty-second possible implementation manner of the first aspect, the transmission type of the third information includes a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

With reference to any one of the foregoing possible implementation manners, in a twenty-third possible implementation manner of the first aspect, the transmission type of the third information further includes one or more of the following kinds: a spreading sequence index, the number of occupied physical resource blocks (PRB), a control channel element (CCE) or enhanced control channel element (eCCE) aggregation level or rank, a modulation and coding scheme, and power configuration, where the transmission type of the third information corresponds to the rank of the channel loss extent.

With reference to any one of the foregoing possible implementation manners, in a twenty-fourth possible implementation manner of the first aspect, after the receiving third information according to a transmission type of the third information, where the transmission type of the third information corresponds to the determined rank of the channel loss extent of the first UE, the method further includes: combining the third information according to the repeating factor K that corresponds to the transmission type of the third information, and detecting the combined third information; or despreading the third information according to the spreading factor K that corresponds to the transmission type of the third information, and detecting the despread third information.

With reference to any one of the foregoing possible implementation manners, in a twenty-fifth possible implementation manner of the first aspect, the method further includes: receiving a response message for the random access response message, where the response message for the random access response message includes one or more of the following kinds: a service type, a service characteristic, a category, and dedicated discontinuous reception (DRX) configuration information of the first UE; or receiving a random access preamble, where the random access preamble indicates one or more of the following kinds: a service type, a service characteristic, a category, and dedicated discontinuous reception (DRX) configuration information of the first UE.

With reference to any one of the foregoing possible implementation manners, in a twenty-sixth possible implementation manner of the first aspect, the channel loss includes: path loss between the first UE and the serving base station of the first UE, reference signal received power (RSRP), reference signal received quality (RSRQ), or channel quality information (CQI); or path loss between the first UE and the neighboring base station, RSRP, RSRQ, or CQI.

In a second aspect, a method for determining channel loss is provided and includes: detecting, by a first user equipment (UE), a channel loss extent of the first UE; and sending first information that corresponds to a rank of the channel loss extent of the first UE to a first base station, so that the first base station determines the rank of the channel loss extent of the first UE according to the first information.

In a first possible implementation manner of the second aspect, correspondence exists between the rank of the channel loss extent of the first UE and a transmission type of the first information.

With reference to any one of the foregoing possible implementation manners, in a second possible implementation manner of the second aspect, the first information is a random access preamble, and before the first information that corresponds to the rank of the channel loss extent of the first UE is sent to the first base station, the first UE selects a random access preamble from a random access preamble group that corresponds to the rank of the channel loss extent of the first UE; or the first information is a random access preamble, and the sending first information that corresponds to a rank of the channel loss extent of the first UE to a first base station includes: sending, by the first UE, the first information according to a transmission type corresponding to the rank of the channel loss extent of the first UE.

With reference to any one of the foregoing possible implementation manners, in a third possible implementation manner of the second aspect, the random access preamble is a random access preamble in a random access preamble group among N random access preamble groups that are determined for the first UE, where N is a positive integer, and all random access preambles included in the N random access preamble groups are random access preambles all used for contention; or the first UE is an MTC UE, and all random access preambles included in the N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

With reference to any one of the foregoing possible implementation manners, in a fourth possible implementation manner of the second aspect, that all random access preambles included in the N random access preamble groups are random access preambles all used for contention includes that:

one random access preamble group among the N random access preamble groups includes all random access preambles in the random access preamble group A and the random access preamble group B; or one random access preamble group among the N random access preamble groups is the random access preamble group A, and another random access preamble group is the random access preamble group B.

With reference to any one of the foregoing possible implementation manners, in a fifth possible implementation manner of the second aspect, before the first information that corresponds to the rank of the channel loss extent of the first UE is sent to the first base station, configuration of the N random access preamble groups that is sent by the first base station is received, where the configuration of the N random access preamble groups is carried in one or more of the following kinds of signaling: radio resource control (RRC) common signaling, RRC dedicated signaling, media access control (MAC) control element (CE) signaling, and physical-layer signaling; or configuration of the N random access preamble groups is predetermined, where the configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

With reference to any one of the foregoing possible implementation manners, in a sixth possible implementation manner of the second aspect, before the first information that corresponds to the rank of the channel loss extent of the first UE is sent to the first base station, the transmission type of the first information is received, where the transmission type of the first information is sent by the first base station and the transmission type of the first information is carried in one or more of the following kinds of signaling: RRC common signaling, RRC dedicated signaling, MAC CE signaling, and physical-layer signaling; or the transmission type of the first information is predefined.

With reference to any one of the foregoing possible implementation manners, in a seventh possible implementation manner of the second aspect, in the case in which the first UE sends the first information according to the transmission type corresponding to the rank of the channel loss extent of the first UE, time and/or frequency resource locations of enhanced random access opportunities corresponding to different transmission types of the first information do not overlap each other.

With reference to any one of the foregoing possible implementation manners, in an eighth possible implementation manner of the second aspect, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

With reference to any one of the foregoing possible implementation manners, in a ninth possible implementation manner of the second aspect, the transmission type of the first information includes one or more of the following kinds: a spreading sequence index, a random access preamble format, and power configuration, where the transmission type of the first information corresponds to the rank of the channel loss extent.

With reference to any one of the foregoing possible implementation manners, in a tenth possible implementation manner of the second aspect, before the first information that corresponds to the rank of the channel loss extent of the first UE is sent to the first base station, classification information about classifying channel loss extents into N ranks is received, where the classification information is sent by the first base station and the classification information is carried in one or more of the following kinds of signaling: RRC common signaling, RRC dedicated signaling, MAC CE signaling, and physical-layer signaling; or N ranks of channel loss extents are determined according to a predefined rule.

With reference to any one of the foregoing possible implementation manners, in an eleventh possible implementation manner of the second aspect, the classification information includes: a parameter that is used to indicate a value of N and/or a threshold parameter that is used to determine the N ranks.

With reference to any one of the foregoing possible implementation manners, in a twelfth possible implementation manner of the second aspect, the sending first information that corresponds to a rank of the channel loss extent of the first UE to a first base station includes: sending the first information to the first base station via a neighboring base station, where the neighboring base station is a serving base station of the first UE; and/or the sending first information that corresponds to a rank of the channel loss extent of the first UE to a first base station includes: sending the first information to the first base station, so that the first base station sends the first information or the determined rank of the channel loss extent of the first UE to a neighboring base station.

With reference to any one of the foregoing possible implementation manners, in a thirteenth possible implementation manner of the second aspect, after the sending the first information to the first base station via a neighboring base station, the method further includes: receiving random access preamble information configured by the first base station; and sending a random access preamble to the first base station according to configuration of the random access preamble information.

With reference to any one of the foregoing possible implementation manners, in a fourteenth possible implementation manner of the second aspect, after the sending the first information to the first base station, so that the first base station sends the first information or the determined rank of the channel loss extent of the first UE to a neighboring base station, the method further includes: receiving random access preamble information configured by the neighboring base station; and sending a random access preamble to the neighboring base station according to configuration of the random access preamble information.

With reference to any one of the foregoing possible implementation manners, in a fifteenth possible implementation manner of the second aspect, the random access preamble information includes one or more of the following kinds of parameters: a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

With reference to any one of the foregoing possible implementation manners, in a sixteenth possible implementation manner of the second aspect, after the first user equipment (UE) detects the channel loss extent of the first UE, third information is sent and/or received according to a transmission type of the third information, where the transmission type of the third information corresponds to the rank of the channel loss extent of the first UE.

With reference to any one of the foregoing possible implementation manners, in a seventeenth possible implementation manner of the second aspect, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

With reference to any one of the foregoing possible implementation manners, in an eighteenth possible implementation manner of the second aspect, transmission types of at least two kinds of third information are different; or all kinds of third information have a same transmission type.

With reference to any one of the foregoing possible implementation manners, in a nineteenth possible implementation manner of the second aspect, before the third information is transmitted, the transmission type of the third information is received, where the transmission type of the third information is sent by the first base station and the transmission type of the third information is carried in one or more of the following kinds of signaling: RRC common signaling, RRC dedicated signaling, MAC CE signaling, and physical-layer signaling; or the transmission type of the third information is predetermined; or before the third information is transmitted, a random access response message and/or a contention resolution message sent by the first base station is received, where the random access response message and/or the contention resolution message carries the transmission type of the third information.

With reference to any one of the foregoing possible implementation manners, in a twentieth possible implementation manner of the second aspect, the transmission type of the third information includes a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

With reference to any one of the foregoing possible implementation manners, in a twenty-first possible implementation manner of the second aspect, the transmission type of the third information further includes one or more of the following kinds: a spreading sequence index, the number of occupied physical resource blocks PRB, a control channel element CCE or enhanced control channel element eCCE aggregation level or rank, a modulation and coding scheme, and power configuration, where the transmission type of the third information corresponds to the rank of the channel loss extent.

With reference to any one of the foregoing possible implementation manners, in a twenty-second possible implementation manner of the second aspect, after the third information is received according to the transmission type of the third information, where the transmission type of the third information corresponds to the rank of the channel loss extent of the first UE, the method further includes:
    combining the third information according to the repeating factor K that corresponds to the transmission type of the third information, and detecting the combined third information; or despreading the third information according to the spreading factor K that corresponds to the transmission type of the third information, and detecting the despread third information.

With reference to any one of the foregoing possible implementation manners, in a twenty-third possible implementation manner of the second aspect, the method further includes: sending a response message for the random access response message to the first base station, where the response message for the random access response message includes one or more of the following kinds: a service type, a service characteristic, a category, and dedicated discontinuous reception DRX configuration information of the first UE; or sending a random access preamble to the first base station, where the random access preamble indicates one or more of the following kinds: a service type, a service characteristic, a category, and dedicated discontinuous reception DRX configuration information of the first UE.

With reference to any one of the foregoing possible implementation manners, in a twenty-fourth possible implementation manner of the second aspect, the channel loss includes: path loss between the first UE and the first base station, reference signal received power (RSRP), reference signal received quality (RSRQ), or channel quality information (CQI); or path loss between the first UE and the neighboring base station, RSRP, RSRQ, or CQI.

In a third aspect, a base station is provided and includes: a transmission unit, configured to receive first information that is from a first user equipment (UE) and corresponds to a rank of a channel loss extent of the first UE; and a determining unit, configured to determine the rank of the channel loss extent of the first UE according to the first information.

In a first possible implementation manner of the third aspect, the transmission unit is configured to receive the first information according to correspondence between the rank of the channel loss extent and a transmission type of the first information.

With reference to any one of the foregoing possible implementation manners, in a second possible implementation manner of the third aspect, the first information is a random access preamble, and the determining unit is configured to determine a random access preamble group in which the first information is located, and determine the rank of the channel loss extent of the first UE according to correspondence between the random access preamble group and the rank of the channel loss extent; or the first information is a random access preamble, and the determining unit is configured to determine the rank of the channel loss extent of the first UE according to the correspondence between the transmission type of the first information and the rank of the channel loss extent.

With reference to any one of the foregoing possible implementation manners, in a third possible implementation manner of the third aspect, the random access preamble is a random access preamble in a random access preamble group among N random access preamble groups that are determined for the first UE, where N is a positive integer, and all random access preambles included in the N random access preamble groups are random access preambles all used for contention; or the first UE is a machine type communications (MTC) UE, and all random access preambles included in the N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

With reference to any one of the foregoing possible implementation manners, in a fourth possible implementation manner of the third aspect, that all random access preambles included in the N random access preamble groups are random access preambles all used for contention includes that: one random access preamble group among the N random access preamble groups includes all random access preambles in the random access preamble group A and the random access preamble group B; or one random access preamble group among the N random access preamble groups is the random access preamble group A, and another random access preamble group is the random access preamble group B.

With reference to any one of the foregoing possible implementation manners, in a fifth possible implementation manner of the third aspect, the transmission unit is configured to, before the first information that is from the first user equipment (UE) and corresponds to the rank of the channel loss extent of the first UE is received, inform the first UE of configuration of the N random access preamble groups by using one or more of the following kinds of signaling: radio resource control (RRC) common signaling, RRC dedicated signaling, media access control (MAC) control element CE signaling, and physical-layer signaling; or configuration of the N random access preamble groups is predetermined, where the configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

With reference to any one of the foregoing possible implementation manners, in a sixth possible implementation manner of the third aspect, the transmission unit is configured to, before the first information that is from the first user equipment (UE) and corresponds to the rank of the channel loss extent of the first UE is received, inform the first UE of the transmission type of the first information by using one or more of the following kinds of signaling: RRC common signaling, RRC dedicated signaling, MAC CE signaling, and physical-layer signaling; or the transmission type of the first information is predefined.

With reference to any one of the foregoing possible implementation manners, in a seventh possible implementation manner of the third aspect, in the case in which the rank of the channel loss extent of the first UE is determined according to the correspondence between the transmission type of the first information and the rank of the channel loss extent, time and/or frequency resource locations of enhanced random access opportunities corresponding to different transmission types of the first information do not overlap each other.

With reference to any one of the foregoing possible implementation manners, in an eighth possible implementation manner of the third aspect, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

With reference to any one of the foregoing possible implementation manners, in a ninth possible implementation manner of the third aspect, the transmission type of the first information includes one or more of the following kinds: a spreading sequence index, a random access preamble format, and power configuration, where the transmission type of the first information corresponds to the rank of the channel loss extent.

With reference to any one of the foregoing possible implementation manners, in a tenth possible implementation manner of the third aspect, the base station further includes: a detection unit, configured to combine the first information according to the repeating factor M that corresponds to the transmission type of the first information, and detect the combined first information by using a sequence in a predetermined set; or despread the first information according to the spreading factor M that corresponds to the transmission type of the first information, and detect the despread first information by using a sequence in a predetermined set.

With reference to any one of the foregoing possible implementation manners, in an eleventh possible implementation manner of the third aspect, the transmission unit is configured to, before the first information that is from the first user equipment (UE) and corresponds to the rank of the channel loss extent of the first UE is received, inform, by using one or more of the following kinds of signaling: RRC common signaling, RRC dedicated signaling, MAC CE signaling, and physical-layer signaling, the first UE of classification information about classifying channel loss extents into N ranks; or N ranks of channel loss extents are determined according to a predefined rule.

With reference to any one of the foregoing possible implementation manners, in a twelfth possible implementation manner of the third aspect, the classification information includes: a parameter that is used to indicate a value of N and/or a threshold parameter that is used to determine the N ranks.

With reference to any one of the foregoing possible implementation manners, in a thirteenth possible implementation manner of the third aspect, the transmission unit is configured to receive the first information that is from the first UE and is conveyed by a neighboring base station, where the neighboring base station is a serving base station of the first UE; and/or the transmission unit is configured to send the first information or the determined rank of the channel loss extent of the first UE to a neighboring base station.

With reference to any one of the foregoing possible implementation manners, in a fourteenth possible implementation manner of the third aspect, the base station further includes: a configuring unit, configured to determine the rank of the channel loss extent of the first UE according to the first information, and configure random access preamble information corresponding to the rank of the channel loss extent of the first UE; the transmission unit is configured to inform the neighboring base station of the configured random access preamble information, so that the neighboring base station sends the configured random access preamble information to the first UE; and the transmission unit is configured to receive a random access preamble that is sent by the first UE and indicated by the configured random access preamble information.

With reference to any one of the foregoing possible implementation manners, in a fifteenth possible implementation manner of the third aspect, the transmission unit is configured to receive random access preamble information sent by the neighboring base station; and the transmission unit is configured to send the received random access preamble information to the first UE.

With reference to any one of the foregoing possible implementation manners, in a sixteenth possible implementation manner of the third aspect, the random access preamble information includes one or more of the following kinds of parameters: a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

With reference to any one of the foregoing possible implementation manners, in a seventeenth possible implementation manner of the third aspect, the base station includes: a detection unit, configured to combine the random access preamble according to the repeating factor M, and detect the combined random access preamble; or despread the random access preamble according to the spreading factor M, and detect the despread random access preamble.

With reference to any one of the foregoing possible implementation manners, in an eighteenth possible implementation manner of the third aspect, the transmission unit is configured to send and/or receive third information according to a transmission type of the third information, where the transmission type of the third information corresponds to the determined rank of the channel loss extent of the first UE.

With reference to any one of the foregoing possible implementation manners, in a nineteenth possible implementation manner of the third aspect, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

With reference to any one of the foregoing possible implementation manners, in a twentieth possible implementation manner of the third aspect, transmission types of at least two kinds of third information are different; or all kinds of third information have a same transmission type.

With reference to any one of the foregoing possible implementation manners, in a twenty-first possible implementation manner of the third aspect, the transmission unit is further configured to, before the third information is transmitted, inform the first UE of the transmission type of the third information by using one or more of the following kinds of signaling: radio resource control (RRC) common signaling, RRC dedicated signaling, media access control (MAC) control element CE signaling, and physical-layer signaling; or the transmission type of the third information is predetermined; or the transmission unit is further configured to, before the third information is transmitted, send the transmission type of the third information to the first UE by using a random access response message and/or a contention resolution message.

With reference to any one of the foregoing possible implementation manners, in a twenty-second possible implementation manner of the third aspect, the transmission type of the third information includes a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

With reference to any one of the foregoing possible implementation manners, in a twenty-third possible implementation manner of the third aspect, the transmission type of the third information further includes one or more of the following kinds: a spreading sequence index, the number of occupied physical resource blocks (PRB), a control channel element (CCE) or enhanced control channel element (eCCE) aggregation level or rank, a modulation and coding scheme, and power configuration, where the transmission type of the third information corresponds to the rank of the channel loss extent.

With reference to any one of the foregoing possible implementation manners, in a twenty-fourth possible implementation manner of the third aspect, the base station further includes: a detection unit, configured to combine the third information according to the repeating factor K that corresponds to the transmission type of the third information, and detect the combined third information; or despread the third information according to the spreading factor K that corresponds to the transmission type of the third information, and detect the despread third information.

With reference to any one of the foregoing possible implementation manners, in a twenty-fifth possible implementation manner of the third aspect, the transmission unit is further configured to receive a response message for the random access response message, where the response message for the random access response message includes one or more of the following kinds: a service type, a service characteristic, a category, and dedicated discontinuous reception (DRX) configuration information of the first UE; or the transmission unit is further configured to receive a random access preamble, where the random access preamble indicates one or more of the following kinds: a service type, a service characteristic, a category, and dedicated discontinuous reception (DRX) configuration information of the first UE.

With reference to any one of the foregoing possible implementation manners, in a twenty-sixth possible implementation manner of the third aspect, the channel loss includes: path loss between the first UE and the serving base station of the first UE, reference signal received power (RSRP), reference signal received quality (RSRQ), or channel quality information (CQI); or path loss between the first UE and the neighboring base station, RSRP, RSRQ, or CQI.

In a fourth aspect, a UE is provided and includes: a detection unit, configured to detect a channel loss extent of the UE; and a transmission unit, configured to send first information that corresponds to a rank of the channel loss extent of the UE to a first base station, so that the first base station determines the rank of the channel loss extent of the UE according to the first information.

In a first possible implementation manner of the fourth aspect, correspondence exists between the rank of the channel loss extent of the UE and a transmission type of the first information.

With reference to any one of the foregoing possible implementation manners, in a second possible implementation manner of the fourth aspect, the first information is a random access preamble, and the UE further includes: a selection unit, configured to, before the first information that corresponds to the rank of the channel loss extent of the UE is sent to the first base station, select a random access preamble from a random access preamble group that corresponds to the rank of the channel loss extent of the UE; or the first information is a random access preamble, and the transmission unit sends the first information according to a transmission type corresponding to the rank of the channel loss extent of the UE.

With reference to any one of the foregoing possible implementation manners, in a third possible implementation manner of the fourth aspect, the random access preamble is a random access preamble in a random access preamble group among N random access preamble groups that are determined for the UE, where N is a positive integer, and all random access preambles included in the N random access preamble groups are random access preambles all used for contention; or the UE is an MTC UE, and all random access preambles included in the N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

With reference to any one of the foregoing possible implementation manners, in a fourth possible implementation manner of the fourth aspect, that all random access preambles included in the N random access preamble groups are random access preambles all used for contention includes that: one random access preamble group among the N random access preamble groups includes all random access preambles in the random access preamble group A and the random access preamble group B; or one random access preamble group among the N random access preamble groups is the random access preamble group A, and another random access preamble group is the random access preamble group B.

With reference to any one of the foregoing possible implementation manners, in a fifth possible implementation manner of the fourth aspect, the transmission unit is further configured to, before the first information that corresponds to the rank of the channel loss extent of the UE is sent to the first base station, receive configuration of the N random access preamble groups that is sent by the first base station, where the configuration of the N random access preamble groups is carried in one or more of the following kinds of signaling: radio resource control (RRC) common signaling, RRC dedicated signaling, media access control (MAC) control element CE signaling, and physical-layer signaling; or configuration of the N random access preamble groups is predetermined, where the configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

With reference to any one of the foregoing possible implementation manners, in a sixth possible implementation manner of the fourth aspect, the transmission unit is further configured to, before the first information that corresponds to the rank of the channel loss extent of the UE is sent to the first base station, receive the transmission type of the first information, where the transmission type of the first information is sent by the first base station and the transmission type of the first information is carried in one or more of the following kinds of signaling: RRC common signaling, RRC dedicated signaling, MAC CE signaling, and physical-layer signaling; or the transmission type of the first information is predefined.

With reference to any one of the foregoing possible implementation manners, in a seventh possible implementation manner of the fourth aspect, in the case in which the UE sends the first information according to the transmission type corresponding to the rank of the channel loss extent of the UE, time and/or frequency resource locations of enhanced random access opportunities corresponding to different transmission types of the first information do not overlap each other.

With reference to any one of the foregoing possible implementation manners, in an eighth possible implementation manner of the fourth aspect, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

With reference to any one of the foregoing possible implementation manners, in a ninth possible implementation manner of the fourth aspect, the transmission type of the first information includes one or more of the following kinds: a spreading sequence index, a random access preamble format, and power configuration, where the transmission type of the first information corresponds to the rank of the channel loss extent.

With reference to any one of the foregoing possible implementation manners, in a tenth possible implementation manner of the fourth aspect, the transmission unit is further configured to, before the first information that corresponds to the rank of the channel loss extent of the UE is sent to the first base station, receive classification information about classifying channel loss extents into N ranks, where the classification information is sent by the first base station and the classification information is carried in one or more of the following kinds of signaling: RRC common signaling, RRC dedicated signaling, MAC CE signaling, and physical-layer signaling; or N ranks of channel loss extents are determined according to a predefined rule.

With reference to any one of the foregoing possible implementation manners, in an eleventh possible implementation manner of the fourth aspect, the classification information includes: a parameter that is used to indicate a value of N and/or a threshold parameter that is used to determine the N ranks.

With reference to any one of the foregoing possible implementation manners, in a twelfth possible implementation manner of the fourth aspect, the transmission unit is configured to send the first information to the first base station via a neighboring base station, where the neighboring base station is a serving base station of the UE; and/or the transmission unit is configured to send the first information to the first base station, so that the first base station sends the first information or the determined rank of the channel loss extent of the UE to a neighboring base station.

With reference to any one of the foregoing possible implementation manners, in a thirteenth possible implementation manner of the fourth aspect, the transmission unit is further configured to, after the first information is sent to the first base station via the neighboring base station, receive random access preamble information configured by the first base station; and send a random access preamble to the first base station according to configuration of the random access preamble information.

With reference to any one of the foregoing possible implementation manners, in a fourteenth possible implementation manner of the fourth aspect, the transmission unit is further configured to, after the first information is sent to the first base station, so that the first base station sends the first information or the determined rank of the channel loss extent of the UE to the neighboring base station, receive random access preamble information configured by the neighboring base station; and send a random access preamble to the neighboring base station according to configuration of the random access preamble information.

With reference to any one of the foregoing possible implementation manners, in a fifteenth possible implementation manner of the fourth aspect, the random access preamble information includes one or more of the following kinds of parameters: a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

With reference to any one of the foregoing possible implementation manners, in a sixteenth possible implementation manner of the fourth aspect, the transmission unit is further configured to, after the detection unit detects the channel loss extent of the UE, send and/or receive third information according to a transmission type of the third information, where the transmission type of the third information corresponds to the rank of the channel loss extent of the UE.

With reference to any one of the foregoing possible implementation manners, in a seventeenth possible implementation manner of the fourth aspect, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

With reference to any one of the foregoing possible implementation manners, in an eighteenth possible implementation manner of the fourth aspect, transmission types of at least two kinds of third information are different; or all kinds of third information have a same transmission type.

With reference to any one of the foregoing possible implementation manners, in a nineteenth possible implementation manner of the fourth aspect, the transmission unit is further configured to, before the third information is transmitted, receive the transmission type of the third information, where the transmission type of the third information is sent by the first base station and the transmission type of the third information is carried in one or more of the following kinds of signaling: RRC common signaling, RRC dedicated signaling, MAC CE signaling, and physical-layer signaling; or the transmission type of the third information is predetermined; or the transmission unit is further configured to, before the third information is transmitted, receive a random access response message and/or a contention resolution message sent by the first base station, where the random access response message and/or the contention resolution message carries the transmission type of the third information.

With reference to any one of the foregoing possible implementation manners, in a twentieth possible implementation manner of the fourth aspect, the transmission type of the third information includes a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

With reference to any one of the foregoing possible implementation manners, in a twenty-first possible implementation manner of the fourth aspect, the transmission type of the third information further includes one or more of the following kinds: a spreading sequence index, the number of occupied physical resource blocks (PRB), a control channel element (CCE) or enhanced control channel element (eCCE) aggregation level or rank, a modulation and coding scheme, and power configuration, where the transmission type of the third information corresponds to the rank of the channel loss extent.

With reference to any one of the foregoing possible implementation manners, in a twenty-second possible implementation manner of the fourth aspect, the detection unit is further configured to combine the third information according to the repeating factor K that corresponds to the transmission type of the third information, and detect the combined third information; or despread the third information according to the spreading factor K that corresponds to the transmission type of the third information, and detect the despread third information.

With reference to any one of the foregoing possible implementation manners, in a twenty-third possible implementation manner of the fourth aspect, the transmission unit is further configured to send a response message for the random access response message to the first base station, where the response message for the random access response message includes one or more of the following kinds: a service type, a service characteristic, a category, and dedicated discontinuous reception (DRX) configuration information of the UE; or the transmission unit is further configured to send a random access preamble to the first base station, where the random access preamble indicates one or more of the following kinds: a service type, a service characteristic, a category, and dedicated discontinuous reception (DRX) configuration information of the UE.

With reference to any one of the foregoing possible implementation manners, in a twenty-fourth possible implementation manner of the fourth aspect, the channel loss includes: path loss between the UE and the first base station, reference signal received power (RSRP), reference signal received quality (RSRQ), or channel quality information (CQI); or path loss between the UE and the neighboring base station, RSRP, RSRQ, or CQI.

In a fifth aspect, a base station is provided and includes: a transceiver, configured to transmit and receive a signal; and a processor, configured to perform the following steps: controlling the transceiver to receive first information that is from a first user equipment (UE) and corresponds to a rank of a channel loss extent of the first UE; and determining the rank of the channel loss extent of the first UE according to the first information.

In a first possible implementation manner of the fifth aspect, the processor is configured to control, in the following manner, the transceiver to receive the first information that is from the first user equipment (UE) and corresponds to the rank of the channel loss extent of the first UE: receiving the first information according to correspondence between the rank of the channel loss extent and a transmission type of the first information.

With reference to any one of the foregoing possible implementation manners, in a second possible implementation manner of the fifth aspect, the first information is a random access preamble, and the processor is configured to determine the rank of the channel loss extent of the first UE according to the first information in the following manner: determining a random access preamble group in which the first information is located, and determining the rank of the channel loss extent of the first UE according to correspondence between the random access preamble group and the rank of the channel loss extent; or determining the rank of the channel loss extent of the first UE according to correspondence between the transmission type of the first information and the rank of the channel loss extent.

With reference to any one of the foregoing possible implementation manners, in a third possible implementation manner of the fifth aspect, the random access preamble is a random access preamble in a random access preamble group among N random access preamble groups that are determined for the first UE, where N is a positive integer, and
  all random access preambles included in the N random access preamble groups are random access preambles all used for contention; or
  the first UE is a machine type communications (MTC) UE, and all random access preambles included in the N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

With reference to any one of the foregoing possible implementation manners, in a fourth possible implementation manner of the fifth aspect, that all random access preambles included in the N random access preamble groups are random access preambles all used for contention includes that:
  one random access preamble group among the N random access preamble groups includes all random access preambles in the random access preamble group A and the random access preamble group B; or one random access preamble group among the N random access preamble groups is the random access preamble group A, and another random access preamble group is the random access preamble group B.

With reference to any one of the foregoing possible implementation manners, in a fifth possible implementation manner of the fifth aspect, the processor controls the transceiver to inform, before the first information that is from the first user equipment (UE) and corresponds to the rank of the channel loss extent of the first UE is received, the first UE of configuration of the N random access preamble groups by using one or more of the following kinds of signaling: radio resource control (RRC) common signaling, RRC dedicated signaling, media access control (MAC) control element (CE) signaling, and physical-layer signaling; or configuration of the N random access preamble groups is predetermined, where the configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

With reference to any one of the foregoing possible implementation manners, in a sixth possible implementation manner of the fifth aspect, the processor controls the transceiver to inform, before the first information that is from the first user equipment (UE) and corresponds to the rank of the channel loss extent of the first UE is received, the first UE of the transmission type of the first information by using one or more of the following kinds of signaling: RRC common signaling, RRC dedicated signaling, MAC CE signaling, and physical-layer signaling; or the transmission type of the first information is predefined.

With reference to any one of the foregoing possible implementation manners, in a seventh possible implementation manner of the fifth aspect, in the case in which the rank of the channel loss extent of the first UE is determined according to the correspondence between the transmission type of the first information and the rank of the channel loss extent, time and/or frequency resource locations of enhanced random access opportunities corresponding to different transmission types of the first information do not overlap each other.

With reference to any one of the foregoing possible implementation manners, in an eighth possible implementation manner of the fifth aspect, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

With reference to any one of the foregoing possible implementation manners, in a ninth possible implementation manner of the fifth aspect, the transmission type of the first information includes one or more of the following kinds: a spreading sequence index, a random access preamble format, and power configuration, where the transmission type of the first information corresponds to the rank of the channel loss extent.

With reference to any one of the foregoing possible implementation manners, in a tenth possible implementation manner of the fifth aspect, after the first information is received, the processor combines the first information according to the repeating factor M that corresponds to the transmission type of the first information, and detects the combined first information by using a sequence in a predetermined set; or despreads the first information according to the spreading factor M that corresponds to the transmission type of the first information, and detects the despread first information by using a sequence in a predetermined set.

With reference to any one of the foregoing possible implementation manners, in an eleventh possible implementation manner of the fifth aspect, the processor controls the transceiver to inform, before the first information that is from the first user equipment (UE) and corresponds to the rank of the channel loss extent of the first UE is received, by using one or more of the following kinds of signaling: RRC common signaling, RRC dedicated signaling, MAC CE signaling, and physical-layer signaling, the first UE of classification information about classifying channel loss extents into N ranks; or N ranks of channel loss extents are determined according to a predefined rule.

With reference to any one of the foregoing possible implementation manners, in a twelfth possible implementation manner of the fifth aspect, the classification information includes:

a parameter that is used to indicate a value of N and/or a threshold parameter that is used to determine the N ranks.

With reference to any one of the foregoing possible implementation manners, in a thirteenth possible implementation manner of the fifth aspect, the processor is configured to control, in the following manner, the transceiver to receive the first information that is from the first user equipment (UE) and corresponds to the rank of the channel loss extent of the first UE: receiving the first information that is from the first UE and is conveyed by a neighboring base station, where the neighboring base station is a serving base station of the first UE; and/or the processor controls the transceiver to send, after the first information that is from the first user equipment (UE) and corresponds to the rank of the channel loss extent of the first UE is received, the first information or the determined rank of the channel loss extent of the first UE to a neighboring base station.

With reference to any one of the foregoing possible implementation manners, in a fourteenth possible implementation manner of the fifth aspect, the processor is configured to, after controlling the transceiver to receive the first information that is from the first UE and is conveyed by the neighboring base station, perform the following steps:

determining the rank of the channel loss extent of the first UE according to the first information, and configuring random access preamble information corresponding to the rank of the channel loss extent of the first UE;

controlling the transceiver to inform the neighboring base station of the configured random access preamble information, so that the neighboring base station sends the configured random access preamble information to the first UE; and controlling the transceiver to receive a random access preamble that is sent by the first UE and indicated by the configured random access preamble information.

With reference to any one of the foregoing possible implementation manners, in a fifteenth possible implementation manner of the fifth aspect, the processor is configured to, after controlling the transceiver to send the first information or the determined rank of the channel loss extent of the first UE to the neighboring base station, perform the following steps:

controlling the transceiver to receive random access preamble information sent by the neighboring base station; and controlling the transceiver to send the received random access preamble information to the first UE.

With reference to any one of the foregoing possible implementation manners, in a sixteenth possible implementation manner of the fifth aspect, the random access preamble information includes one or more of the following kinds of parameters:

a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

With reference to any one of the foregoing possible implementation manners, in a seventeenth possible implementation manner of the fifth aspect, the processor is configured to, after controlling the transceiver to receive the random access preamble that is sent by the first UE and indicated by the configured random access preamble information, perform the following step: combining the random access preamble according to the repeating factor M, and detecting the combined random access preamble; or despreading the random access preamble according to the spreading factor M, and detecting the despread random access preamble.

With reference to any one of the foregoing possible implementation manners, in an eighteenth possible implementation manner of the fifth aspect, the processor is configured to, after the rank of the channel loss extent of the first UE is determined according to the first information, control the transceiver to send and/or receive third information according to a transmission type of the third information, where the transmission type of the third information corresponds to the determined rank of the channel loss extent of the first UE.

With reference to any one of the foregoing possible implementation manners, in a nineteenth possible implementation manner of the fifth aspect, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

With reference to any one of the foregoing possible implementation manners, in a twentieth possible implementation manner of the fifth aspect, transmission types of at least two kinds of third information are different; or all kinds of third information have a same transmission type.

With reference to any one of the foregoing possible implementation manners, in a twenty-first possible implementation manner of the fifth aspect, the processor controls the transceiver to inform, before the third information is transmitted, the first UE of the transmission type of the third information by using one or more of the following kinds of signaling: radio resource control (RRC) common signaling, RRC dedicated signaling, media access control (MAC) control element (CE) signaling, and physical-layer signaling; or the transmission type of the third information is predetermined; or the processor controls the transceiver to send, before the third information is transmitted, the transmission type of the third information to the first UE by using a random access response message and/or a contention resolution message.

With reference to any one of the foregoing possible implementation manners, in a twenty-second possible implementation manner of the fifth aspect, the transmission type of the third information includes a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

With reference to any one of the foregoing possible implementation manners, in a twenty-third possible implementation manner of the fifth aspect, the transmission type of the third information further includes one or more of the following kinds: a spreading sequence index, the number of occupied physical resource blocks (PRB), a control channel element (CCE) or enhanced control channel element (eCCE) aggregation level or rank, a modulation and coding scheme, and power configuration, where the transmission type of the third information corresponds to the rank of the channel loss extent.

With reference to any one of the foregoing possible implementation manners, in a twenty-fourth possible implementation manner of the fifth aspect, the processor is configured to, after controlling the transceiver to receive the third information according to the transmission type of the third information, where the transmission type of the third information corresponds to the determined rank of the channel loss extent of the first UE, perform the following step:

combining the third information according to the repeating factor K that corresponds to the transmission type of the third information, and detecting the combined third information; or despreading the third information according to the spreading factor K that corresponds to the transmission type of the third information, and detecting the despread third information.

With reference to any one of the foregoing possible implementation manners, in a twenty-fifth possible implementation manner of the fifth aspect, the processor controls the transceiver to receive a response message for the random access response message, where the response message for the random access response message includes one or more of the following kinds: a service type, a service characteristic, a category, and dedicated discontinuous reception (DRX) configuration information of the first UE; or the processor controls the transceiver to receive a random access preamble, where the random access preamble indicates one or more of the following kinds: a service type, a service characteristic, a category, and dedicated discontinuous reception (DRX) configuration information of the first UE.

With reference to any one of the foregoing possible implementation manners, in a twenty-sixth possible implementation manner of the fifth aspect, the channel loss includes: path loss between the first UE and the serving base station of the first UE, reference signal received power (RSRP), reference signal received quality (RSRQ), or channel quality information (CQI); or path loss between the first UE and the neighboring base station, RSRP, RSRQ, or CQI.

In a sixth aspect, a user equipment (UE) is provided and includes: a transceiver, configured to transmit and receive a signal; and a processor, configured to perform the following steps: detecting a channel loss extent of the UE; and controlling the transceiver to send first information that corresponds to a rank of the channel loss extent of the UE to a first base station, so that the first base station determines the rank of the channel loss extent of the UE according to the first information.

In a first possible implementation manner of the sixth aspect, correspondence exists between the rank of the channel loss extent of the UE and a transmission type of the first information.

With reference to any one of the foregoing possible implementation manners, in a second possible implementation manner of the sixth aspect, the first information is a random access preamble, and the processor selects, before controlling the transceiver to send the first information that corresponds to the rank of the channel loss extent of the UE to the first base station, a random access preamble from a random access preamble group that corresponds to the rank of the channel loss extent of the UE; or the first information is a random access preamble, and the processor controls, in the following manner, the transceiver to send the first information that corresponds to the rank of the channel loss extent of the UE to the first base station: sending the first information according to a transmission type corresponding to the rank of the channel loss extent of the UE.

With reference to any one of the foregoing possible implementation manners, in a third possible implementation manner of the sixth aspect, the random access preamble is a random access preamble in a random access preamble group among N random access preamble groups that are determined for the UE, where N is a positive integer, and
  all random access preambles included in the N random access preamble groups are random access preambles all used for contention; or
  the UE is an MTC UE, and all random access preambles included in the N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

With reference to any one of the foregoing possible implementation manners, in a fourth possible implementation manner of the sixth aspect, that all random access preambles included in the N random access preamble groups are random access preambles all used for contention includes that:
  one random access preamble group among the N random access preamble groups includes all random access preambles in the random access preamble group A and the random access preamble group B; or one random access preamble group among the N random access preamble groups is the random access preamble group A, and another random access preamble group is the random access preamble group B.

With reference to any one of the foregoing possible implementation manners, in a fifth possible implementation manner of the sixth aspect, the processor controls the transceiver to receive, before the first information that corresponds to the rank of the channel loss extent of the UE is sent to the first base station, configuration of the N random access preamble groups that is sent by the first base station, where the configuration of the N random access preamble groups is carried in one or more of the following kinds of signaling: radio resource control (RRC) common signaling, RRC dedicated signaling, media access control (MAC) control element (CE) signaling, and physical-layer signaling; or configuration of the N random access preamble groups is predetermined, where
  the configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

With reference to any one of the foregoing possible implementation manners, in a sixth possible implementation manner of the sixth aspect, the processor controls the transceiver to receive, before the first information that corresponds to the rank of the channel loss extent of the UE is sent to the first base station, the transmission type of the first information, where the transmission type of the first information is sent by the first base station and the transmission type of the first information is carried in one or more of the following kinds of signaling: RRC common signaling, RRC dedicated signaling, MAC CE signaling, and physical-layer signaling; or
  the transmission type of the first information is predefined.

With reference to any one of the foregoing possible implementation manners, in a seventh possible implementation manner of the sixth aspect, in the case in which the UE sends the first information according to the transmission type corresponding to the rank of the channel loss extent of the UE, time and/or frequency resource locations of enhanced random access opportunities corresponding to different transmission types of the first information do not overlap each other.

With reference to any one of the foregoing possible implementation manners, in an eighth possible implementation manner of the sixth aspect, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

With reference to any one of the foregoing possible implementation manners, in a ninth possible implementation manner of the sixth aspect, the transmission type of the first information includes one or more of the following kinds: a spreading sequence index, a random access preamble format, and power configuration, where the transmission type of the first information corresponds to the rank of the channel loss extent.

With reference to any one of the foregoing possible implementation manners, in a tenth possible implementation manner of the sixth aspect, the processor controls the transceiver to receive, before the first information that corresponds to the rank of the channel loss extent of the UE is sent to the first base station, classification information about classifying channel loss extents into N ranks, where the classification information is sent by the first base station and the classification information is carried in one or more of the following kinds of signaling: RRC common signaling, RRC dedicated signaling, MAC CE signaling, and physical-layer signaling; or N ranks of channel loss extents are determined according to a predefined rule.

With reference to any one of the foregoing possible implementation manners, in an eleventh possible implementation manner of the sixth aspect, the classification information includes: a parameter that is used to indicate a value of N and/or a threshold parameter that is used to determine the N ranks.

With reference to any one of the foregoing possible implementation manners, in a twelfth possible implementation manner of the sixth aspect, the processor controls, in the following manner, the transceiver to send the first information that corresponds to the rank of the channel loss extent of the UE to the first base station: sending the first information to the first base station via a neighboring base station, where the neighboring base station is a serving base station of the UE; and/or the processor controls, in the following manner, the transceiver to send the first information that corresponds to the rank of the channel loss extent of the UE to the first base station: sending the first information to the first base station, so that the first base station sends the first information or the determined rank of the channel loss extent of the UE to a neighboring base station.

With reference to any one of the foregoing possible implementation manners, in a thirteenth possible implementation manner of the sixth aspect, the processor controls the transceiver to receive, after the first information is sent to the first base station via the neighboring base station, random access preamble information configured by the first base station; and send a random access preamble to the first base station according to configuration of the random access preamble information.

With reference to any one of the foregoing possible implementation manners, in a fourteenth possible implementation manner of the sixth aspect, the processor controls the transceiver to receive, after the first information is sent to the first base station, so that the first base station sends the first information or the determined rank of the channel loss extent of the UE to the neighboring base station, random access preamble information configured by the neighboring base station; and send a random access preamble to the neighboring base station according to configuration of the random access preamble information.

With reference to any one of the foregoing possible implementation manners, in a fifteenth possible implementation manner of the sixth aspect, the random access preamble information includes one or more of the following kinds of parameters: a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

With reference to any one of the foregoing possible implementation manners, in a sixteenth possible implementation manner of the sixth aspect, the processor controls the transceiver to send and/or receive, after the processor detects the channel loss extent of the UE, third information according to a transmission type of the third information, where the transmission type of the third information corresponds to the rank of the channel loss extent of the UE.

With reference to any one of the foregoing possible implementation manners, in a seventeenth possible implementation manner of the sixth aspect, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

With reference to any one of the foregoing possible implementation manners, in an eighteenth possible implementation manner of the sixth aspect, transmission types of at least two kinds of third information are different; or all kinds of third information have a same transmission type.

With reference to any one of the foregoing possible implementation manners, in a nineteenth possible implementation manner of the sixth aspect, the processor controls the transceiver to receive, before the third information is transmitted, the transmission type of the third information, where the transmission type of the third information is sent by the first base station and the transmission type of the third information is carried in one or more of the following kinds of signaling: RRC common signaling, RRC dedicated signaling, MAC CE signaling, and physical-layer signaling; or the transmission type of the third information is predetermined; or the processor controls the transceiver to receive, before the third information is transmitted, a random access response message and/or a contention resolution message sent by the first base station, where the random access response message and/or the contention resolution message carries the transmission type of the third information.

With reference to any one of the foregoing possible implementation manners, in a twentieth possible implementation manner of the sixth aspect, the transmission type of the third information includes: a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

With reference to any one of the foregoing possible implementation manners, in a twenty-first possible implementation manner of the sixth aspect, the transmission type of the third information further includes one or more of the following kinds: a spreading sequence index, the number of occupied physical resource blocks (PRB), a control channel element (CCE) or enhanced control channel element (eCCE) aggregation level or rank, a modulation and coding scheme, and power configuration, where the transmission type of the third information corresponds to the rank of the channel loss extent.

With reference to any one of the foregoing possible implementation manners, in a twenty-second possible implementation manner of the sixth aspect, the processor is configured to, after controlling the transceiver to receive the third information according to the transmission type of the third information, where the transmission type of the third information corresponds to the rank of the channel loss extent of the UE, perform the following step: combining the third information according to the repeating factor K that corresponds to the transmission type of the third information, and detecting the combined third information; or despreading the third information according to the spreading factor K that corresponds to the transmission type of the third information, and detecting the despread third information.

With reference to any one of the foregoing possible implementation manners, in a twenty-third possible implementation manner of the sixth aspect, the processor controls the transceiver to send a response message for the random access response message to the first base station, where the response message for the random access response message includes one or more of the following kinds: a service type, a service characteristic, a category, and dedicated discontinuous reception (DRX) configuration information of the UE; or the processor controls the transceiver to send a random access preamble to the first base station, where the random access preamble indicates one or more of the following kinds: a service type, a service characteristic, a category, and dedicated discontinuous reception (DRX) configuration information of the UE.

With reference to any one of the foregoing possible implementation manners, in a twenty-fourth possible implementation manner of the sixth aspect, the channel loss includes: path loss between the UE and the first base station, reference signal received power (RSRP), reference signal received quality (RSRQ), or channel quality information (CQI); or path loss between the UE and the neighboring base station, RSRP, RSRQ, or CQI.

In the embodiments of the present application, a base station can learn a rank of a channel loss extent of a first UE, so as to perform data transmission according to the rank, thereby improving the quality of communications between the base station and the first UE.

DETAILED DESCRIPTION

The following describes the technical solutions in the embodiments of the present application with reference to the accompanying drawings. Apparently, the embodiments to be described are merely a part rather than all of the embodiments of the present application. All other embodiments obtained by a person of ordinary skill in the art based on the embodiments of the present application without creative efforts shall fall within the protection scope of the present application. In a conflict-free case, the embodiments of the present application can be combined and features in the embodiments can also be combined.

In the present application, a first UE may be an MTC UE, a base station may be an evolved NodeB (eNB) in LTE, and transmission may be sending and/or receiving.

Figure 1:
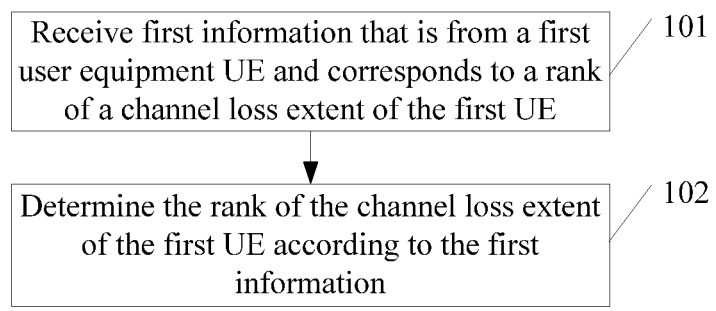
FIG. 1 is a flowchart of a method for determining channel loss according to an embodiment of the present application.

An embodiment of the present application provides a method for determining channel loss, the method may be implemented by a base station, and as shown in FIG. 1, the method includes:

Step 101: Receive first information that is from a first user equipment (UE) and corresponds to a rank of a channel loss extent of the first UE.

Step 102: Determine the rank of the channel loss extent of the first UE according to the first information.

In this embodiment, a base station can learn a rank of a channel loss extent of a first UE, so as to perform data transmission according to the rank, thereby improving the quality of communications between the base station and the first UE.

Preferably, the receiving first information that is from a first user equipment (UE) and corresponds to a rank of a channel loss extent of the first UE includes: receiving the first information according to correspondence between the rank of the channel loss extent and a transmission type of the first information. In the prior art, a rank of a channel loss extent is irrelevant to a transmission type of information, whereas in this embodiment, when a rank of a channel loss extent is different, a transmission type of the first information is also different, and the base station receives the first information according to a transmission type that corresponds to a rank of each channel loss extent.

Figure 2:
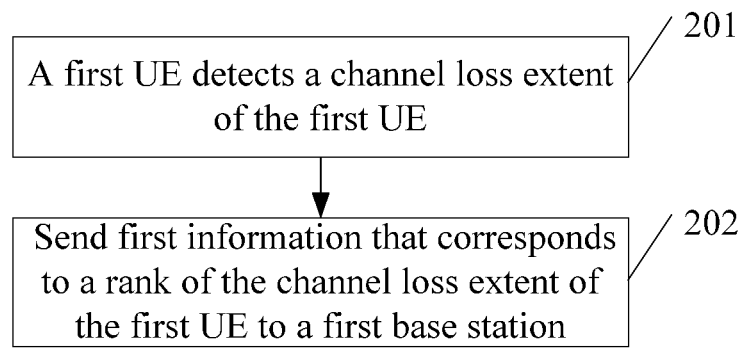
FIG. 2 is a flowchart of another method for determining channel loss according to an embodiment of the present application.

An embodiment of the present application provides another method for determining channel loss, the method may be implemented by a UE, and as shown in FIG. 2, the method includes:

Step 201: A first UE detects a channel loss extent of the first UE.

Step 202: Send first information that corresponds to a rank of the channel loss extent of the first UE to a first base station, so that the first base station determines the rank of the channel loss extent of the first UE according to the first information.

In this embodiment, a base station can learn a rank of a channel loss extent of a first UE, so as to perform data transmission according to the rank, and thereby improving the quality of communications between the base station and the first UE.

Preferably, correspondence exists between the rank of the channel loss extent of the first UE and a transmission type of the first information.

Figure 3:
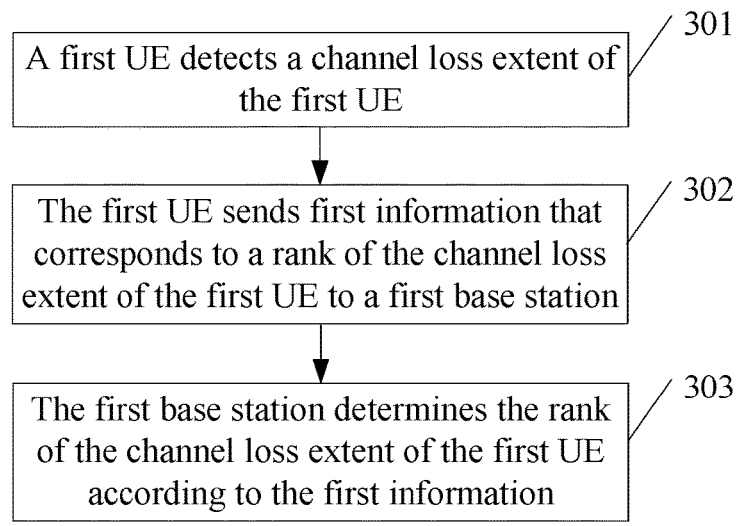
FIG. 3 is a flowchart of still another method for determining channel loss according to an embodiment of the present application.

An embodiment of the present application provides still another method for determining channel loss, and as shown in FIG. 3, the method includes:

Step 301: A first UE detects a channel loss extent of the first UE.

Step 302: The first UE sends first information that corresponds to a rank of the channel loss extent of the first UE to a first base station.

Step 303: The first base station determines the rank of the channel loss extent of the first UE according to the first information.

Preferably, step 302 may include that: the first base station receives the first information according to correspondence between the rank of the channel loss extent and a transmission type of the first information.

Optionally, that the first base station determines the rank of the channel loss extent of the first UE according to the first information includes that: the first information is a random access preamble, a random access preamble group in which the first information is located is determined, and the rank of the channel loss extent of the first UE is determined according to correspondence between the random access preamble group and the rank of the channel loss extent; or the first information is a random access preamble, and the rank of the channel loss extent of the first UE is determined according to the correspondence between the transmission type of the first information and the rank of the channel loss extent.

Preferably, the random access preamble is a random access preamble in a random access preamble group among N random access preamble groups that are determined for the first UE, where N is a positive integer, and all random access preambles included in the N random access preamble groups are random access preambles all used for contention; or the first UE is an MTC UE, and all random access preambles included in N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

Preferably, that all random access preambles included in the N random access preamble groups are random access preambles all used for contention includes that: one random access preamble group among the N random access preamble groups includes all random access preambles in the random access preamble group A and the random access preamble group B; or one random access preamble group among the N random access preamble groups is the random access preamble group A, and another random access preamble group is the random access preamble group B.

Preferably, before the first information that is from the first user equipment (UE) and corresponds to the rank of the channel loss extent of the first UE is received, the first base station informs the first UE of configuration of the N random access preamble groups by using one or more of the following kinds of signaling: radio resource control (RRC) common signaling, RRC dedicated signaling, media access control (MAC) control element (CE) signaling, and physical-layer signaling; or configuration of the N random access preamble groups is predetermined. The configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

Optionally, before the first information that is from the first user equipment (UE) and corresponds to the rank of the channel loss extent of the first UE is received, the first base station informs the first UE of the transmission type of the first information by using one or more of the following kinds of signaling: RRC common signaling, RRC dedicated signaling, MAC CE signaling, and physical-layer signaling; or the transmission type of the first information is predefined.

Optionally, in the case in which the rank of the channel loss extent of the first UE is determined according to the correspondence between the transmission type of the first information and the rank of the channel loss extent, time and/or frequency resource locations of enhanced random access opportunities corresponding to different transmission types of the first information do not overlap each other.

Preferably, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

Preferably, the transmission type of the first information includes one or more of the following kinds: a spreading sequence index, a random access preamble format, and power configuration, where the transmission type of the first information corresponds to the rank of the channel loss extent.

Preferably, after the first information is received according to the correspondence between the rank of the channel loss extent and the transmission type of the first information, the first base station combines the first information according to the repeating factor M that corresponds to the transmission type of the first information, and detects the combined first information by using a sequence in a predetermined set; or despreads the first information according to the spreading factor M that corresponds to the transmission type of the first information, and detects the despread first information by using a sequence in a predetermined set.

Optionally, before the first information that is from the first user equipment (UE) and corresponds to the rank of the channel loss extent of the first UE is received, the first base station informs, by using one or more of the following kinds of signaling: RRC common signaling, RRC dedicated signaling, MAC CE signaling, and physical-layer signaling, the first UE of classification information about classifying channel loss extents into N ranks; or N ranks of channel loss extents are determined according to a predefined rule.

Optionally, the foregoing classification information includes: a parameter that is used to indicate a value of N and/or a threshold parameter that is used to determine the N ranks.

Preferably, the receiving the first information that is from the first user equipment (UE) and corresponds to the rank of the channel loss extent of the first UE includes: receiving, by the first base station, the first information that is from the first UE and is conveyed by a neighboring base station, where the neighboring base station is a serving base station of the first UE; and/or after receiving the first information that is from the first user equipment (UE) and corresponds to the rank of the channel loss extent of the first UE, sending, by the first base station, the first information or the determined rank of the channel loss extent of the first UE to a neighboring base station.

Preferably, after the first information that is from the first UE and is conveyed by the neighboring base station is received, the first base station determines the rank of the channel loss extent of the first UE according to the first information, configures random access preamble information corresponding to the rank of the channel loss extent of the first UE, and informs the neighboring base station of the configured random access preamble information, so that the neighboring base station sends the configured random access preamble information to the first UE; and the first base station receives a random access preamble that is sent by the first UE and indicated by the configured random access preamble information.

Optionally, after the first information or the determined rank of the channel loss extent of the first UE is sent to the neighboring base station, the first base station receives random access preamble information sent by the neighboring base station, and sends the received random access preamble information to the first UE.

Preferably, the random access preamble information includes one or more of the following kinds of parameters: a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

Preferably, after the random access preamble that is sent by the first UE and indicated by the configured random access preamble information is received, the first base station combines the random access preamble according to the repeating factor M, and detects the combined random access preamble; or despreads the random access preamble according to the spreading factor M, and detects the despread random access preamble.

Optionally, after the first base station determines the rank of the channel loss extent of the first UE according to the first information, the first base station sends and/or receives third information according to a transmission type of the third information, where the transmission type of the third information corresponds to the determined rank of the channel loss extent of the first UE.

Preferably, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

Optionally, transmission types of at least two kinds of third information are different; or all kinds of third information have a same transmission type.

Preferably, before the third information is transmitted, the first base station informs the first UE of the transmission type of the third information by using one or more of the following kinds of signaling: radio resource control (RRC) common signaling, RRC dedicated signaling, media access control (MAC) control element CE signaling, and physical-layer signaling; or the transmission type of the third information is predetermined; or before the third information is transmitted, the first base station sends the transmission type of the third information to the first UE by using a random access response message and/or a contention resolution message.

Optionally, the transmission type of the third information includes a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

Optionally, the transmission type of the third information further includes one or more of the following kinds: a spreading sequence index, the number of occupied physical resource blocks (PRB), a control channel element (CCE) or enhanced control channel element (eCCE) aggregation level or rank, a modulation and coding scheme, and power configuration, where the transmission type of the third information corresponds to the rank of the channel loss extent.

Preferably, after the third information is received according to the transmission type of the third information, where the transmission type of the third information corresponds to the determined rank of the channel loss extent of the first UE, the first base station combines the third information according to the repeating factor K that corresponds to the transmission type of the third information, and detects the combined third information; or the first base station despreads the third information according to the spreading factor K that corresponds to the transmission type of the third information, and detects the despread third information.

Optionally, the first base station receives a response message for the random access response message, where the response message for the random access response message includes one or more of the following kinds: a service type, a service characteristic, a category, and dedicated discontinuous reception (DRX) configuration information of the first UE; or the first base station receives a random access preamble, where the random access preamble indicates one or more of the following kinds: a service type, a service characteristic, a category, and dedicated discontinuous reception (DRX) configuration information of the first UE.

Optionally, the foregoing channel loss includes: path loss between the first UE and the serving base station of the first UE, reference signal received power (RSRP), reference signal received quality (RSRQ), or channel quality information (CQI); or path loss between the first UE and the neighboring base station, RSRP, RSRQ, or CQI.

An embodiment of the present application further provides an enhanced transmission method to enhance network coverage of an existing LTE or LTE-A system, so that a network-side device of the LTE or LTE-A system can establish a reliable service link with a first UE (especially an MTC UE). In this embodiment, it is assumed that the network coverage needs to be enhanced by a maximum of x dB (for example, x=20). In practice, because different UEs are in different channel environments, a network-side device can establish a reliable service link with a UE when an enhancement value of network coverage is a certain value within 0–x dB. If coverage enhancement is performed on an existing system according to a maximum value, that is, x dB, instead of distinguishing an enhancement value required practically, resource scheduling flexibility is lost and many resources are wasted. This problem of resource scheduling flexibility and resource waste can be solved in this embodiment, where a random access preamble is enhanced first. In this way, reliable sending of the random access preamble is implemented, and a base station can learn a rank of a channel loss extent of a first UE or a channel loss extent of a first UE by detecting the random access preamble, and selects, according to the learned rank of the channel loss extent or the learned channel loss extent, an enhancement manner for at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

Embodiment 1

This embodiment provides an enhanced transmission method, where the method can be used for enhancing transmission of a random access preamble in contention-based random access. The method is described in detail in the following.

A base station determines N (N>1) random access preamble groups for a first UE, where the N random access preamble groups may be obtained through classification of all random access preambles used for contention or obtained through classification of part of random access preambles used for contention.

The following exemplifies several methods for obtaining random access preamble groups through classification:

Method 1: The base station determines N (N>1) random access preamble groups for the first UE, where the N random access preamble groups may be obtained through classification of all random access preambles used for contention.

In this method, the number of all random access preambles used for contention may not be configured or may be configured by using one or more of the following kinds of signaling: RRC common signaling (for example, by using a system information block (SIBx) or a master information block (MIB)), RRC dedicated signaling, MAC CE signaling, and physical-layer signaling; and the number of all random access preambles used for contention may also be indicated by a parameter of numberOfRA-Preambles, where the parameter numberOfRA-Preambles indicates the number of preambles that can be used for contention-based random access by a UE (herein referred to as a normal UE) except an MTC UE (that is, the number of random access preambles that are included in a preamble group A and a preamble group B).

N is a positive integer value predetermined by the base station (or a system or a network-side entity), N may be a fixed value or may be configured by the system by using one or more of the following kinds of signaling: RRC common signaling (for example, by using a system information block (SIBx) or a master information block (MIB)), RRC dedicated signaling, MAC CE signaling, and physical-layer signaling. The numbers of random access preambles that are included in all preamble groups of the N random access preamble groups may be the same or may be different. The number of random access preambles that are included in each random access preamble group may be a fixed value or may be configured by the system by using one or more of the following kinds of signaling: RRC common signaling (for example, by using a system information block (SIBx) or a master information block (MIB)), RRC dedicated signaling, MAC CE signaling, and physical-layer signaling.

For example, configuration information for indicating N and the number of random access preambles that are included in each random access preamble group may be added into common random access configuration (RACH-ConfigCommon) included in a SIB2.

```
RACH-ConfigCommon ::=                              SEQUENCE {
         ..................................................
         preambleGroupNumber                        ENUMERATED {n2, n3, n4, n5,......},
              preamblesGroupConfig ::= SEQUENCE (SIZE (1.. preambleGroupNumber)) OF
    preambleGroupInfo}
```

```
    preambleGroupInfo { sizeOfRA-PreamblesGroup       ENUMERATED
{n4,n8,n16,......} }
    }
```

In an information element (IE) of the foregoing RACH-ConfigCommon, the number of preamble groups (preambleGroupNumber) is used to indicate the number N of random access preamble groups, and a size of a random access preamble group (sizeOfRA-PreamblesGroup) is used to indicate the number of random access preambles that are included in each random access preamble group.

In the foregoing example, by default, a rank of preamble indexes of random access preambles that are included in a first random access preamble group is [0 (sizeOfRA-PreamblesGroup1)−1], and a rank of preamble indexes of random access preambles that are included in an $n^{th}$ random access preamble group is [(The number of random access preambles that are included in the first random access preamble group)+ . . . +(The number of random access preambles that are included in an $(n-1)^{th}$ random access preamble group) (The number of random access preambles that are included in the first random access preamble group)+ . . . +(The number of random access preambles that are included in the $n^{th}$ random access preamble group)−1], where n is a positive integer less than or equal to N.

Optionally, a starting preamble index of random access preambles that are included in each random access preamble group may be configured by using one or more of the following kinds of signaling: RRC common signaling (for example, by using a system information block (SIBx) or a master information block (MIB)), RRC dedicated signaling, MAC CE signaling, and physical-layer signaling; or only a starting preamble index of random access preambles that are included in the first random access preamble group is configured.

Method 2: The base station classifies part of random access preambles used for contention into N (N>1) random access preamble groups.

By taking into account that a normal UE uses a random access preamble in a preamble group A or a preamble group B to perform random access, in order not to affect a random access process of the normal UE, random access preambles used by the first UE may be grouped among other random access preambles except random access preambles that are included in the preamble group A and the preamble group B.

For example, it is assumed that a system has K random access preambles in total, a rank of indexes of random access preambles that are included in the preamble group A is [0 sizeOfRA-PreamblesGroupA−1], and a rank of indexes of random access preambles that are included in the preamble group B is [sizeOfRA-PreamblesGroupA numberofRA-Preambles−1], where sizeOfRA-PreamblesGroupA and numberOfRA-Preambles are informed by the system by using RRC signaling, sizeOfRA-PreamblesGroupA indicates the number of preambles that are included in the preamble group A, and numberOfRA-Preambles indicates the number of preambles that can be used for contention-based random access by the normal UE.

The base station performs preamble grouping for the first UE among remaining K−(numberOfRA-Preambles) random access preambles. As described in the foregoing, the number N of random access preamble groups that are obtained through classification for the first UE and the number of random access preambles that are included in each random access preamble group may be a predetermined fixed value or may be configured by the system by using one or more of the following kinds of signaling: RRC common signaling (for example, by using a system information block (SIBx) or a master information block (MIB)), RRC dedicated signaling, MAC CE signaling, and physical-layer signaling.

```
RACH-ConfigCommon ::=                SEQUENCE {
    preambleInfo                         SEQUENCE {
        numberOfRA-Preambles
        preamblesGroupAConfig            SEQUENCE {sizeOfRA-PreamblesGroupA}
                                             -- Need OP
        preamblesGroupConfigForMTC       SEQUENCE {
            sizeOfRA-PreamblesGroup1     ENUMERATED {X,X,X...},
            sizeOfRA-PreamblesGroup2     ENUMERATED {X,X,X...},
        }
    }
    ...
}
```

If a starting preamble index of random access preambles that are included in a new random access preamble group is not informed by using signaling, a determined starting preamble index of random access preambles that are included in a first new random access preamble group starts from numberOfRA-Preambles and a rank is [numberOfRA-Preambles (numberOfRA-Preambles)+(sizeOfRA-PreamblesGroup1)−1], and a rank of preamble indexes of random access preambles that are included in an $n^{th}$ random access preamble group is [numberOfRA-Preambles+(The number of random access preambles that are included in a first random access preamble group)++(The number of random access preambles that are included in an $(n-1)^{th}$ random access preamble group) numberOfRA-Preambles+(The number of random access preambles that are included in the first random access preamble group)++(The number of random access preambles that are included in the $n^{th}$ random access preamble group)−1], where n is a positive integer less than or equal to N.

Optionally, a starting preamble index of random access preambles that are included in each random access preamble group may be configured by using one or more of the following kinds of signaling: RRC common signaling (for example, by using a system information block (SIBx) or a master information block (MIB)), RRC dedicated signaling, MAC CE signaling, and physical-layer signaling; or only a starting preamble index of random access preambles that are included in the first random access preamble group is configured.

The base station may reserve some random access preambles among the remaining K−(numberOfRA−Preambles) random access preambles, where the reserved random access preambles are used for non-contention-based random access. However, because resources (including a random access preamble and a location of a time-frequency resource for sending the random access preamble) of the non-contention based random access are informed by the base station to the first UE by using dedicated signaling, preamble reservation (the number of the reserved random access preambles and the random access preambles) for the non-contention-based random access is implemented by the base station, and the preamble reservation for the non-contention-based random access does not affect grouping of random access preambles for the first UE.

Method 3: The base station classifies all random access preambles used for contention into N (N>1) random access preamble groups, and a preamble group A and a preamble group B that are obtained through classification for a normal UE may serve as one or two random access preamble groups of the first UE.

For example, the base station determines N random access preamble groups for the first UE, where:
a first random access preamble group of the first UE is the preamble group A of the normal UE, and
a second random access preamble group of the first UE is the preamble group B of the normal UE, and other N−2 random access preamble groups of the first UE are obtained through grouping of other random access preambles except random access preambles that are included in the preamble group A and the preamble group B; or
a first random access preamble group of the first UE is the preamble group A and the preamble group B of the normal UE, and other N−1 random access preamble groups of the first UE are obtained through grouping of other preambles except random access preambles that are included in the preamble group A and the preamble group B.

As described in the foregoing, the number N of random access preamble groups that are obtained through classification for the first UE and the number of random access preambles that are included in each random access preamble group may be a predetermined fixed value or may be configured by a system by using one or more of the following kinds of signaling: RRC common signaling (for example, by using a system information block (SIBx) or a master information block (MIB)), RRC dedicated signaling, MAC CE signaling, and physical-layer signaling.

Optionally, a starting preamble index of random access preambles that are included in each random access preamble group may be configured by using one or more of the following kinds of signaling: RRC common signaling (for example, by using a system information block (SIBx) or a master information block (MIB)), RRC dedicated signaling, MAC CE signaling, and physical-layer signaling; or only a starting preamble index of random access preambles that are included in the first random access preamble group is configured.

It should be pointed that in the foregoing random access preamble groups, if the total number of random access preambles that are included in the N random access preamble groups is known and random access preambles that are included in the first N−1 random access preamble groups have been configured, random access preambles that are included in an $N^{th}$ random access preamble group are preambles among all random access preambles that are included in the N random access preamble groups except the random access preambles that are included in the first N−1 random access preamble groups. In this case, the $N^{th}$ random access preamble group may not need to be configured by using signaling.

The system, the base station, or another network-side entity classifies channel loss extents between the base station and the first UE into N ranks in advance. For example, if the channel loss extents are classified into three ranks, the three ranks may be:
channel loss extent rank 1: Channel loss ≤x1 dB, where an index of the rank is 1;
channel loss extent rank 2: x1 dB<Channel loss ≤x2 dB, where an index of the rank is 2; and
channel loss extent rank 3: Channel loss >x2, where an index of the rank is 3.

Each channel loss extent rank corresponds to one of the foregoing random access preamble groups. Classification information about classifying channel loss extents into N ranks may be informed by the base station to the first UE by using one or more of the following kinds of signaling: RRC common signaling, RRC dedicated signaling, MAC CE signaling, and physical-layer signaling. The classification information includes: a parameter that is used to indicate a value of N and/or a threshold parameter that is used to determine the N ranks, for example, when N is equal to 3, threshold parameters are x1 and x2. For example, RRC signaling may include an IE for classifying channel loss:

```
PathLossConfig ::=          SEQUENCE {
    x1                      ENUMERATED {X,X,X...},
    x2                      ENUMERATED {X,X,X...},
    ...
}
```

Alternatively, the base station and the first UE determine N ranks of channel loss extents according to a predefined rule. The predefined rule may be a table, for example, Table 1, predefined by the base station and the first UE.

TABLE 1

Classification rule of channel loss extent ranks

| Index of Channel Loss Extent Rank | Classification for Channel Loss Extent Rank |
|---|---|
| 1 | Channel loss ≤ x1 dB |
| 2 | x1 dB < Channel loss ≤ x2 dB |
| 3 | Channel loss > x2 |

The predefined rule may also be a formula predefined by the base station and the first UE, for example, it is assumed that a channel loss extent is indicated by PL, and an index of a rank of the channel loss extent is ⌊PL/X⌋, where ⌊ ⌋ indicates a round-down operation, and X is a fixed constant. The channel loss may be reference signal received power (RSRP), reference signal received quality (RSRQ), path loss calculated by using RSRP or RSRQ, or channel quality information (CQI).

The system, the base station, or another network-side entity correspondingly configures N transmission types for the N ranks of channel loss extents. Each transmission type is used for transmission of a random access preamble in one random access preamble group that corresponds to a rank of a corresponding channel loss extent.

Each transmission type includes a repeating factor or spreading factor M of a random access preamble in an enhanced random access opportunity, M is a positive integer, and M may be obtained through calculation according to a channel loss extent, for example, a first channel loss extent PL in a rank of a channel loss extent is selected, M=fun(PL), and fun( ) indicates a determined formula, where the enhanced random access opportunity embodies a time and/or frequency resource location of a repeated or spread random access preamble. In a time and/or frequency resource location of an enhanced random access opportunity, the first UE may send a random access preamble according to the repeating factor or spreading factor M. Optionally, each transmission type includes one or more of the following kinds: a spreading sequence index, a random access preamble format, and power configuration.

Figure 4:
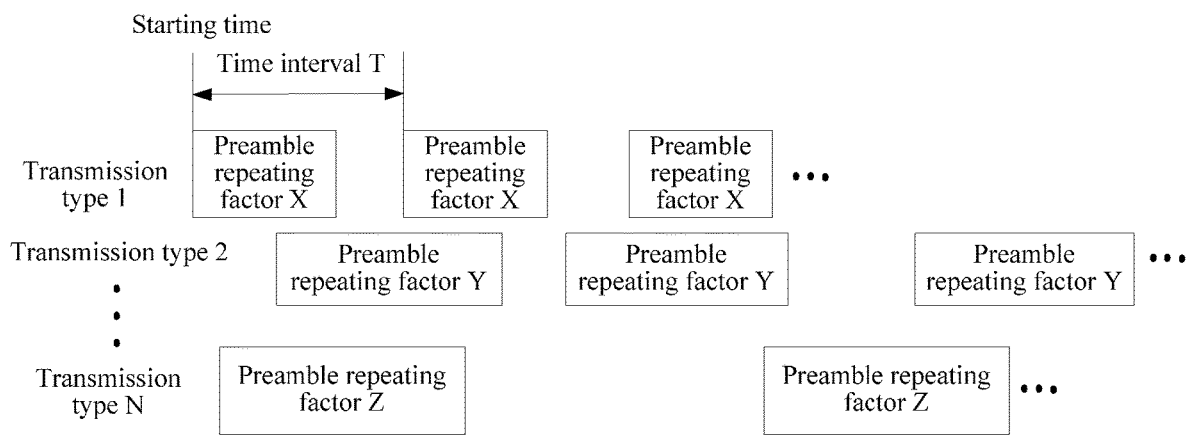
FIG. 4 is a schematic diagram of correspondence between a transmission type and a repeating factor of a random access preamble according to Embodiment 1 of the present application.
Figure 5:
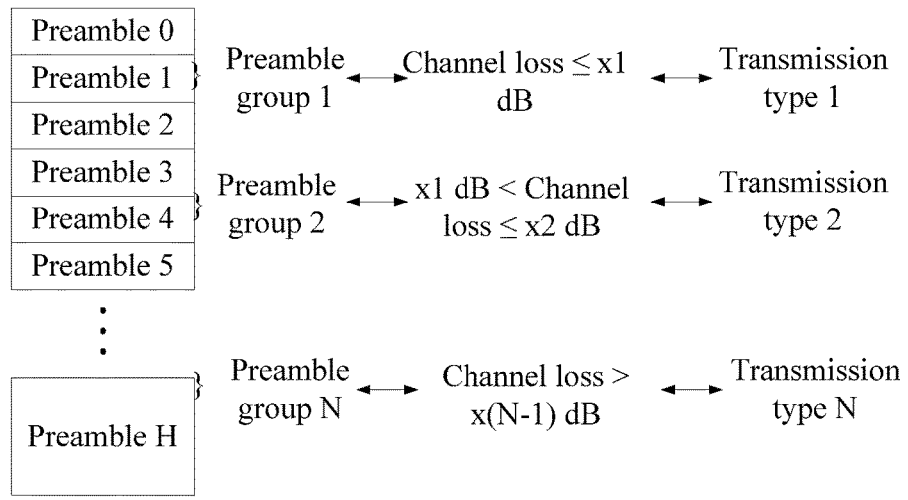
FIG. 5 is a schematic diagram of correspondence between a random access preamble group, channel loss classification, and a transmission type according to Embodiment 1 of the present application.

Correspondence between a transmission type and a repeating factor (indicating repetition times) of a random access preamble is shown in FIG. 4, and correspondence between a random access preamble group, channel loss classification, and a transmission type is shown in FIG. 5.

As shown in FIG. 4, the N transmission types may be determined in a predefined manner or informed to a first UE by using one or more of the following kinds of signaling: RRC common signaling, RRC dedicated signaling, MAC CE signaling, and physical-layer signaling.

FIG. 5 further illustrates an association between a preamble group, channel loss classification, and a transmission type, where H is the number of random access preambles.

A first UE selects a corresponding random access preamble group according to a rank of a channel loss extent of the first UE, randomly selects a random access preamble from the random access preamble group, and sends the random access preamble according to a transmission type that corresponds to the random access preamble group. The first UE selects a different transmission type of a random access preamble for a different channel loss extent, and performs, by using a different repeating factor or spreading factor of the random access preamble and according to a coverage enhancement or compensation value required practically, coverage enhancement for sending the random access preamble, so that reliable transmission of the random access preamble can be implemented, thereby avoiding a waste of a resource.

A base station detects, in a random access opportunity that corresponds to a transmission type corresponding to each random access preamble group, a random access preamble in the random access preamble group, thereby improving reliability of preamble detection. In addition, if the base station successfully detects a preamble in an $n^{th}$ random access preamble group, the base station may learn the rank of the channel loss extent of the first UE or the channel loss extent of the first UE according to correspondence between the random access preamble group and the rank of the channel loss extent or the channel loss extent, and then the base station may select a data channel and/or control channel and/or reference signal enhancement manner for the first UE according to the rank of the channel loss extent of the first UE or the channel loss extent of the first UE.

Embodiment 2

This embodiment provides an enhanced transmission method, where the method can be used in contention-based random access. In this embodiment, preambles do not need to be grouped. An implementation process of this embodiment is described in the following.

(1) A system, a base station, or another network-side entity classifies channel loss extents between the base station and a first UE into N ranks, where classification information about classifying channel loss extents into N ranks may be informed by the base station to the first UE by using one or more of the following kinds of signaling: RRC common signaling, RRC dedicated signaling, MAC CE signaling, and physical-layer signaling, or the base station and the first UE determine N ranks of channel loss extents according to a predefined rule. A method for classification is the same as that in Embodiment 1. Channel loss may be reference signal received power (RSRP), reference signal received quality (RSRQ), path loss calculated by using RSRP or RSRQ, or channel quality information (CQI).

(2) The system, the base station, or another network-side entity correspondingly configures N transmission types for the N ranks of channel loss extents. Each transmission type includes a repeating factor or spreading factor M of a random access preamble in an enhanced random access opportunity, M is a positive integer, and M may be obtained through calculation according to a channel loss extent, as described in Embodiment 1, where the enhanced random access opportunity embodies a time and/or frequency resource location of a repeated or spread random access preamble. In a time and/or frequency resource location of an enhanced random access opportunity, the first UE may send a random access preamble according to the repeating factor or spreading factor M. Optionally, each transmission type includes one or more of the following kinds: a spreading sequence index, a random access preamble format, and power configuration.

The N transmission types may be determined in a predefined manner or informed to the first UE by using one or more of the following kinds of signaling: RRC common signaling, RRC dedicated signaling, MAC CE signaling, and physical-layer signaling.

Figure 6:
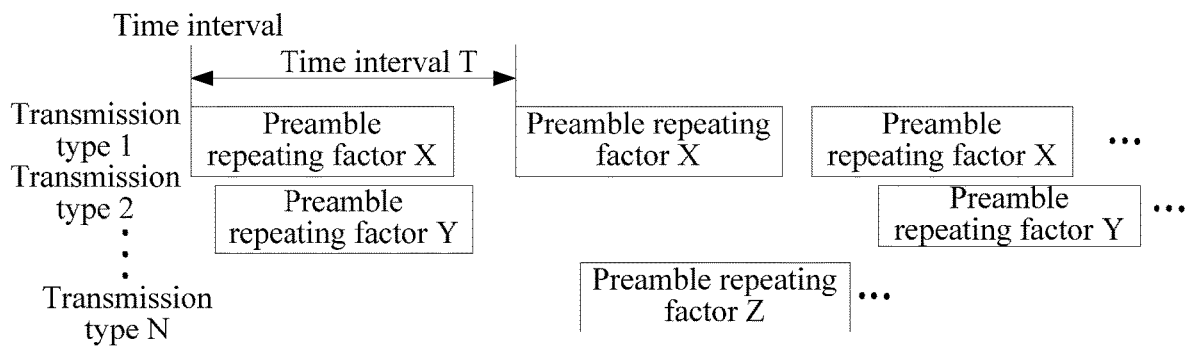
FIG. 6 is a schematic diagram of correspondence between a transmission type and a repeating factor of a random access preamble according to Embodiment 2 of the present application.

FIG. 6 is a schematic diagram of correspondence between a transmission type and a repeating factor (indicating repetition times) of a random access preamble according to Embodiment 2 of the present application. In this embodiment, when the N transmission types are configured, it should be ensured that time and/or frequency locations of random access opportunities that are associated with different transmission types do not overlap each other.

(3) The first UE randomly selects a random access preamble, selects a corresponding transmission type according to a rank of a channel loss extent of the first UE, and sends the random access preamble according to the selected transmission type. The first UE selects a different transmission type of a random access preamble for a different channel loss extent, and performs, by using a different repeating factor or spreading factor of the random access preamble and according to a coverage enhancement or compensation value required practically, coverage enhancement for sending the preamble, so that reliable preamble transmission can be implemented, thereby avoiding a waste of a resource.

(4) The base station detects a random access preamble in a random access opportunity that corresponds to each transmission type, thereby improving reliability of preamble detection. In addition, if the base station successfully detects a random access preamble in a random access opportunity that corresponds to an $n^{th}$ transmission type, the base station may learn the rank of the channel loss extent of the first UE or the channel loss extent of the first UE according to correspondence between the transmission type and the rank of the channel loss extent or the channel loss extent, and then the base station may select a data channel and/or control channel and/or reference signal enhancement manner for the first UE according to the rank of the channel loss extent of the first UE or the channel loss extent of the first UE.

Embodiment 3

This embodiment provides an enhanced transmission method, where the method can be used in non-contention-based random access. An implementation process of this embodiment is described in the following.

This embodiment is applicable to the following two cases:

(1) During a handover, a terminal needs to establish uplink synchronization with a target cell.

A source base station may configure a first UE to measure RSRP, RSRQ, CQI, or path loss of a neighboring cell; after establishing an RRC connection with the source base station through a random access process, the first UE can report the measured RSRP, RSRQ, CQI, or path loss of the neighboring cell to the source base station; and then the source base station obtains the RSRP, RSRQ, CQI, or path loss of the neighboring cell (for example, the target cell).

In this embodiment, when the first UE needs to perform a handover, the source base station informs the RSRP, RSRQ, CQI, or path loss of the target cell or a rank of a channel loss extent to a target base station through an X2 interface, where the RSRP, RSRQ, CQI, or path loss of the target cell is measured by the first UE, so that the target base station obtains channel loss between the target base station and the first UE.

(2) Uplink synchronization needs to be established when the first UE is in an RRC connected (RRC CONNECTED) state, the uplink of the first UE is not synchronized, and the first UE needs to receive new downlink data and perform acknowledgment/non-acknowledgment (ACK/NACK) feedback through the uplink.

Because the first UE is in the RRC CONNECTED state, if a random access preamble sending manner in Embodiment 1 or 2 can be adopted in a random access process before the RRC connection establishment, a base station learns channel loss according to the preamble sending manner; or a base station may learn channel loss of the first UE according to the RSRP, RSRQ, CQI, or path loss reported by the first UE.

A system, a base station, or another network-side entity defines channel loss and performs classification for ranks of channel loss extents according to the manner in Embodiment 1 or 2.

In the non-contention-based random access, after learning the channel loss of the first UE, the base station determines a rank of a channel loss extent between the base station and the first UE and needs to configure random access preamble information corresponding to the rank of the channel loss extent, where the random access preamble information includes one or more of the following kinds of parameters: a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

The random access preamble information may be configured for the first UE by using one or more of the following kinds of signaling: RRC dedicated signaling, media access control (MAC) control element (CE) signaling, and physical-layer signaling. Using the RRC dedicated signaling as an example, in the prior art, an information element of the RRC dedicated signaling, that is, dedicated random access configuration (RACH-ConfigDedicated), includes the following information:

```
RACH-ConfigDedicated ::=    SEQUENCE {
    ra-PreambleIndex            INTEGER (0..63),
    ra-PRACH-MaskIndex          INTEGER (0..15),
}
``` where a random access preamble index (ra-PreambleIndex) is a parameter that is used to specify a dedicated random access preamble used for non-contention-based access of the first UE; and a random access mask index (ra-PRACH-MaskIndex) is an index of a time-frequency resource that can be occupied for sending a random access preamble and is an integer ranging 0 to 15.

Figure 7:
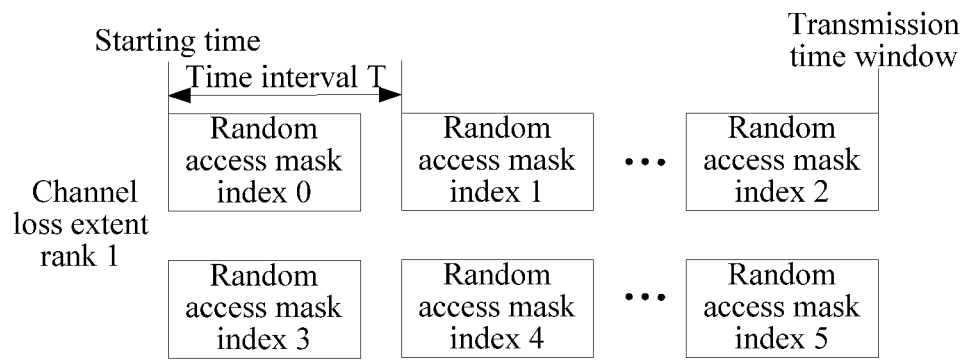
FIG. 7 is a schematic diagram of resource location numbers in a transmission type according to an embodiment of the present application.

In this embodiment, the meaning of ra-PRACH-MaskIndex is re-explained, that is, it is a parameter specifying an enhanced random access opportunity, and is used to indicate a location index of a time-frequency resource that is occupied by a corresponding enhanced random access opportunity when random access is performed by using a random access preamble indicated by the random access preamble information that corresponds to the rank of the channel loss extent. The base station sets, according to the rank of the channel loss extent, a parameter for indicating a size of a time window that includes one or more enhanced random access opportunities, where the parameter for indicating a size of a time window may be a predefined value or may be informed to the first UE by using signaling, for example, RACH-ConfigDedicated further includes a size of a time window (transmissionWindowSize). As shown in FIG. 7, it is assumed that the number of repetition times of preamble transmission in an enhanced random access opportunity is M, random access opportunities are numbered first in a time domain and then in a frequency domain, starting from a starting time of a first random access opportunity with M times of repeated preamble transmission to a size of a transmission time window; and are indicated by ra-PRACH-MaskIndex.

The first UE sends, in a time-frequency resource location specified by the base station, a preamble by using the random access preamble indicated by the random access preamble information and according to configuration of the random access preamble information and the rank of the channel loss extent.

If the base station detects, in a specified time-frequency resource location, a specified preamble sent by the first UE, the base station returns a random access response message, and the random access process ends.

Embodiment 4

In Embodiment 1, 2, or 3, after completing preamble detection, a base station can obtain information about a rank of a channel loss extent of a first UE, where the information about the rank of the channel loss extent can be used for coverage enhancement for a PDCCH/ePDCCH sent by the base station. The PDCCH/ePDCCH for which the coverage enhancement is performed can be applied in scheduling of a message in a random access process and a subsequent unicast service message. An implementation manner of this embodiment is described in detail in the following.

Corresponding transmission types of a PDCCH/ePDCCH for which coverage enhancement is performed are defined for N different ranks of channel loss extents. Different parameters are set for these transmission types for transmission of the PDCCH/ePDCCH for which the coverage enhancement is performed, for example, a transmission type includes a repeating factor or spreading factor K of the PDCCH/ePDCCH for which the coverage enhancement is performed, where the PDCCH/ePDCCH is sent or received in a transmission opportunity of the PDCCH/ePDCCH for which the coverage enhancement is performed, K is a positive integer and is obtained through calculation according to a rank of a channel loss extent, and a calculation method is as shown in Embodiment 1; and the transmission opportunity of the PDCCH/ePDCCH for which the coverage enhancement is performed embodies a location of a time and/or frequency resource for sending or receiving the PDCCH/ePDCCH for which the coverage enhancement is performed.

The transmission type further includes one or more of the following kinds: a spreading sequence index used by the PDCCH/ePDCCH for which the coverage enhancement is performed, the number of physical resource blocks PRB occupied by the PDCCH/ePDCCH for which the coverage enhancement is performed, a control channel element CCE or enhanced control channel element eCCE aggregation level or rank, a modulation and coding scheme of the PDCCH/ePDCCH for which the coverage enhancement is performed, and power configuration.

The N transmission types may be determined in a predefined manner or may be informed to the first UE by using one or more of the following kinds of signaling: RRC common signaling, RRC dedicated signaling, media access control (MAC) control element (CE) signaling, and physical-layer signaling.

The base station selects, according to a learned rank of a channel loss extent of the first UE, a corresponding transmission type of the PDCCH/ePDCCH for which the coverage enhancement is performed, and sends, according to the transmission type, the PDCCH/ePDCCH for which the coverage enhancement is performed.

The first UE detects, according to the rank of the channel loss extent of the first UE and according to the transmission type, the PDCCH/ePDCCH for which the coverage enhancement is performed.

This is described in the following by using an example:

It is assumed that channel loss is classified into three ranks: channel loss rank 1: Channel loss ≤x1 dB; channel loss rank 2: x1 dB<Channel loss ≤x2 dB; and channel loss rank 3: Channel loss ≥x2 dB;

for the PDCCH/ePDCCH for which the coverage enhancement is performed, CCE/eCCE aggregation levels corresponding to the channel loss ranks may be defined as follows:
  channel loss rank 1: CCE/eCCE aggregation levels are 2, 4, and 8;
  channel loss rank 2: CCE/eCCE aggregation levels are 16, 32, and 64; and
  channel loss rank 3: CCE/eCCE aggregation levels are 128, 256, and 512;
  for the PDCCH/ePDCCH for which the coverage enhancement is performed, transmission subframe locations of the PDCCH/ePDCCH that correspond to the channel loss ranks are stipulated as follows:
  channel loss rank 1: any one subframe;
  channel loss rank 2: consecutive 2 or 4 subframes, where a sequence number of a first subframe needs to satisfy the following: (Sequence number of the first subframe) mod(2 or 4)=0, and mod is a modulus operation; and
  channel loss rank 3: consecutive 10 or 40 subframes, where a sequence number of a first subframe needs to satisfy the following: (Sequence number of the first subframe)mod(1 or 4)=0; and
  the CCE/eCCE aggregation levels and the transmission subframe locations of the PDCCH/ePDCCH that correspond to the channel loss ranks may be defined in a predefined manner or informed to the first UE by using RRC signaling.

The base station selects a corresponding coverage enhancement manner for the PDCCH/ePDCCH according to the rank of the channel loss extent of the first UE. It is assumed that a certain channel loss extent of the first UE belongs to rank 2; and in this case, the base station sends the PDCCH/ePDCCH by adopting one of aggregation levels 16, 32, and 64 and performs the sending on 2 or 4 consecutive subframes starting from a frame that satisfies the following: (Sequence number of the subframe)mod(2 or 4)=0.

The first UE performs blind detection on the PDCCH/ePDCCH according to aggregation levels 16, 32, and 64 on consecutive 2 and 4 subframes starting from a subframe that satisfies the following: (Sequence number of the subframe) mod(2 and 4)=0.

Embodiment 5

The method for selecting, according to a rank of a channel loss extent, a transmission type of a PDCCH/ePDCCH for which coverage enhancement is performed described in Embodiment 4 can also be used to transmit at least one of the following: a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH). This is described in detail in the following.

For N different ranks of channel loss extents, N transmission types are defined for one or more of the following: the random access response message, the contention resolution message, the system information, the physical control format indicator channel (PCFICH), the physical hybrid automatic repeat request indicator channel (PHICH), the unicast physical downlink shared channel (PDSCH), the broadcast or multicast physical downlink shared channel (PDSCH), the physical uplink shared channel (PUSCH), the physical uplink control channel (PUCCH), the common reference signal (CRS), the demodulation reference signal (DMRS), the dedicated reference signal (DRS), the synchronization channel (SCH), and the physical broadcast channel (PBCH). Each transmission type is used to stipulate a parameter of a coverage enhancement solution corresponding to a rank of a channel loss extent, for example, a transmission type includes one or more of the following: a repeating factor or spreading factor kl, a spreading sequence index, the number of occupied physical resource blocks PRB, a modulation and coding scheme, and power configuration, where kl is obtained through calculation according to the rank of the channel loss extent, and a calculation method is as shown in Embodiment 1.

A base station selects a corresponding transmission type according to a learned rank of a channel loss extent of a first UE, and sends or receives one or more of the foregoing signal, channel, and message according to the transmission type.

The first UE selects a corresponding transmission type according to the rank of the channel loss extent of the first UE, and sends or receives one or more of the foregoing signal, channel, and message according to the transmission type.

It should be noted that transmission types of at least two of the foregoing signal, channel, and message are different; or the foregoing signal, channel, and message have a same transmission type. A transmission type of one or more of the foregoing signal, channel, or message is informed by the base station to the first UE by using one or more of the following kinds of signaling: RRC common signaling, RRC dedicated signaling, media access control (MAC) control element (CE) signaling, and physical-layer signaling; or a transmission type of one or more of the foregoing signal, channel, or message is predetermined; or a transmission type of one or more of the foregoing signal, channel, or message is informed by the base station to the first UE by using a random access response message and/or a contention resolution message.

Optionally, the PUSCH is used to transmit a response message for the random access response message, where the response message for the random access response message includes one or more of the following: a service type, a service characteristic, a category, and dedicated discontinuous reception (DRX) configuration information of the first UE.

Optionally, a random access preamble is used to indicate one or more of the following kinds: a service type, a service characteristic, a category, and dedicated discontinuous reception DRX configuration information of the first UE.

A service type of a UE refers to a service type of the UE, for example, some UEs are used for meter reading services and some UEs are used for real-time monitoring services. A service characteristic of a UE reflects a service feature of the UE, for example, whether the UE is a fixed UE or a mobile UE, and for another example, whether the UE is a delay-sensitive UE or a delay-insensitive UE. A category of a UE refers whether the UE is a UE of a category 0 or a UE of another category.

Figure 8:
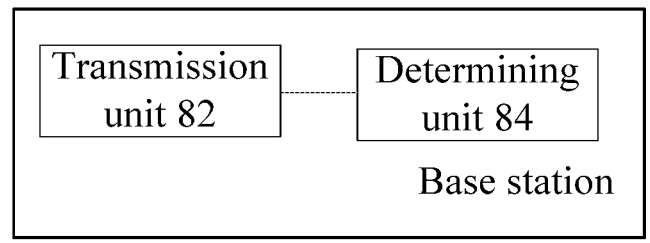
FIG. 8 is a structural block diagram of a base station according to an embodiment of the present application.

An embodiment of the present application provides a base station, configured to implement the foregoing method embodiment. As shown in FIG. 8, the base station includes: a transmission unit 82, configured to receive first information that is from a first user equipment (UE) and corresponds to a rank of a channel loss extent of the first UE; and a determining unit 84, coupled to the transmission unit 82 and configured to determine the rank of the channel loss extent of the first UE according to the first information.

Preferably, the transmission unit is configured to receive the first information according to correspondence between the rank of the channel loss extent and a transmission type of the first information.

Optionally, the first information is a random access preamble, and the determining unit is configured to determine a random access preamble group in which the first information is located, and determine the rank of the channel loss extent of the first UE according to correspondence between the random access preamble group and the rank of the channel loss extent; or the first information is a random access preamble, and the determining unit is configured to determine the rank of the channel loss extent of the first UE according to the correspondence between the transmission type of the first information and the rank of the channel loss extent.

Preferably, the random access preamble is a random access preamble in a random access preamble group among N random access preamble groups that are determined for the first UE, where N is a positive integer, and all random access preambles included in the N random access preamble groups are random access preambles all used for contention; or the first UE is a machine type communications (MTC) UE, and all random access preambles included in N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

Optionally, that all random access preambles included in the N random access preamble groups are random access preambles all used for contention includes that:

one random access preamble group among the N random access preamble groups includes all random access preambles in the random access preamble group A and the random access preamble group B; or one random access preamble group among the N random access preamble groups is the random access preamble group A, and another random access preamble group is the random access preamble group B.

Preferably, the transmission unit is configured to, before the first information that is from the first user equipment (UE) and corresponds to the rank of the channel loss extent of the first UE is received, inform the first UE of configuration of the N random access preamble groups by using one or more of the following kinds of signaling: RRC common signaling, RRC dedicated signaling, media access control (MAC) control element (CE) signaling, and physical-layer signaling; or configuration of the N random access preamble groups is predetermined.

The configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

Preferably, the transmission unit is further configured to, before the first information that is from the first user equipment (UE) and corresponds to the rank of the channel loss extent of the first UE is received, inform the first UE of the transmission type of the first information by using one or more of the following kinds of signaling: RRC common signaling, RRC dedicated signaling, MAC CE signaling, and physical-layer signaling; or the transmission type of the first information is predefined.

Optionally, in the case in which the rank of the channel loss extent of the first UE is determined according to the correspondence between the transmission type of the first information and the rank of the channel loss extent, time and/or frequency resource locations of enhanced random access opportunities corresponding to different transmission types of the first information do not overlap each other.

Preferably, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

Preferably, the transmission type of the first information includes one or more of the following kinds: a spreading sequence index, a random access preamble format, and power configuration, where the transmission type of the first information corresponds to the rank of the channel loss extent.

Figure 9:
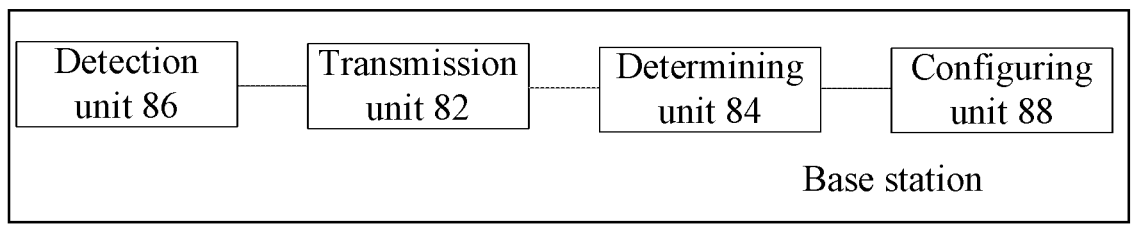
FIG. 9 is an exemplary structural block diagram of a base station according to an embodiment of the present application.

FIG. 9 is an exemplary structural block diagram of a base station according to an embodiment of the present application. Optionally, the base station further includes: a detection unit 86, coupled to the transmission unit and configured to combine the first information according to the repeating factor M that corresponds to the transmission type of the first information, and detect the combined first information by using a sequence in a predetermined set; or despread the first information according to the spreading factor M that corresponds to the transmission type of the first information, and detect the despread first information by using a sequence in a predetermined set.

Preferably, the transmission unit is configured to, before the first information that is from the first user equipment (UE) and corresponds to the rank of the channel loss extent of the first UE is received, inform, by using one or more of the following kinds of signaling: RRC common signaling, RRC dedicated signaling, MAC CE signaling, and physical-layer signaling, the first UE of classification information about classifying channel loss extents into N ranks; or N ranks of channel loss extents are determined according to a predefined rule.

Optionally, the classification information includes: a parameter that is used to indicate a value of N and/or a threshold parameter that is used to determine the N ranks.

Preferably, the transmission unit is configured to receive the first information that is from the first UE and is conveyed by a neighboring base station, where the neighboring base station is a serving base station of the first UE; and/or the transmission unit is configured to send the first information or the determined rank of the channel loss extent of the first UE to a neighboring base station.

As shown in FIG. 9, the base station further includes: a configuring unit 88, coupled to the determining unit and configured to determine the rank of the channel loss extent of the first UE according to the first information, and configure random access preamble information corresponding to the rank of the channel loss extent of the first UE; the transmission unit is configured to inform the neighboring base station of the configured random access preamble information, so that the neighboring base station sends the configured random access preamble information to the first UE; and the transmission unit is configured to receive a random access preamble that is sent by the first UE and indicated by the configured random access preamble information.

Preferably, the transmission unit is configured to receive random access preamble information sent by the neighboring base station; and the transmission unit is configured to send the received random access preamble information to the first UE.

Preferably, the random access preamble information includes one or more of the following kinds of parameters: a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

Optionally, the base station includes: a detection unit 86, configured to combine the random access preamble according to the repeating factor M, and detect the combined random access preamble; or despread the random access preamble according to the spreading factor M, and detect the despread random access preamble.

Optionally, the transmission unit is further configured to send and/or receive third information according to a transmission type of the third information, where the transmission type of the third information corresponds to the determined rank of the channel loss extent of the first UE.

Preferably, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

Preferably, transmission types of at least two kinds of third information are different; or all kinds of third information have a same transmission type.

Optionally, the transmission unit is further configured to, before the third information is transmitted, inform the first UE of the transmission type of the third information by using one or more of the following kinds of signaling: radio resource control (RRC) common signaling, RRC dedicated signaling, media access control (MAC) control element (CE) signaling, and physical-layer signaling; or the transmission type of the third information is predetermined; or the transmission unit is further configured to, before the third information is transmitted, send the transmission type of the third information to the first UE by using a random access response message and/or a contention resolution message.

Optionally, the transmission type of the third information includes: a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

Optionally, the transmission type of the third information further includes one or more of the following kinds: a spreading sequence index, the number of occupied physical resource blocks (PRB), a control channel element (CCE) or enhanced control channel element (eCCE) aggregation level or rank, a modulation and coding scheme, and power configuration, where the transmission type of the third information corresponds to the rank of the channel loss extent.

Preferably, the base station further includes: a detection unit 86, configured to combine the third information according to the repeating factor K that corresponds to the transmission type of the third information, and detect the combined third information; or despread the third information according to the spreading factor K that corresponds to the transmission type of the third information, and detect the despread third information.

Preferably, the transmission unit is further configured to receive a response message for the random access response message, where the response message for the random access response message includes one or more of the following kinds: a service type, a service characteristic, a category, and dedicated discontinuous reception (DRX) configuration information of the first UE; or the transmission unit is further configured to receive a random access preamble, where the random access preamble indicates one or more of the following kinds: a service type, a service characteristic, a category, and dedicated discontinuous reception (DRX) configuration information of the first UE.

Preferably, the channel loss includes: path loss between the first UE and the serving base station of the first UE, reference signal received power (RSRP), reference signal received quality (RSRQ), or channel quality information (CQI); or path loss between the first UE and the neighboring base station, RSRP, RSRQ, or CQI.

Figure 10:
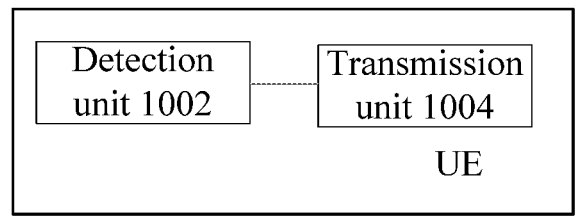
FIG. 10 is a structural block diagram of a UE according to an embodiment of the present application.

An embodiment of the present application further provides a UE, where the UE is configured to implement the foregoing method. As shown in FIG. 10, the UE includes: a detection unit 1002, configured to detect a channel loss extent of the UE; a transmission unit 1004, coupled to the detection unit 1002 and configured to send first information that corresponds to a rank of the channel loss extent of the UE to a first base station, so that the first base station determines the rank of the channel loss extent of the UE according to the first information.

Preferably, correspondence exists between the rank of the channel loss extent of the UE and a transmission type of the first information.

Figure 11:
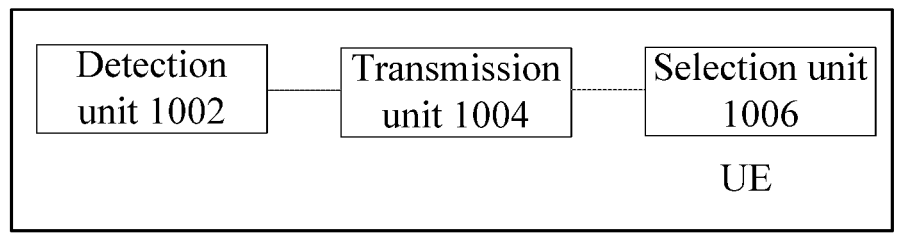
FIG. 11 is an exemplary structural block diagram of a UE according to an embodiment of the present application.

FIG. 11 is an exemplary structural block diagram of a UE according to an embodiment of the present application. Optionally, the first information is a random access preamble, and the UE further includes: a selection unit 1006, coupled to the transmission unit 1004 and configured to, before the first information that corresponds to the rank of the channel loss extent of the UE is sent to the first base station, select a random access preamble from a random access preamble group that corresponds to the rank of the channel loss extent of the UE; or the first information is a random access preamble, and the transmission unit sends the first information according to a transmission type corresponding to the rank of the channel loss extent of the UE.

Preferably, the random access preamble is a random access preamble in a random access preamble group among N random access preamble groups that are determined for the UE, where N is a positive integer, and all random access preambles included in the N random access preamble groups are random access preambles all used for contention; or the UE is an MTC UE, and all random access preambles included in N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

Preferably, that all random access preambles included in the N random access preamble groups are random access preambles all used for contention includes that:

one random access preamble group among the N random access preamble groups includes all random access preambles in the random access preamble group A and the random access preamble group B; or one random access preamble group among the N random access preamble groups is the random access preamble group A, and another random access preamble group is the random access preamble group B.

Preferably, the transmission unit is further configured to, before the first information that corresponds to the rank of the channel loss extent of the UE is sent to the first base station, receive configuration of the N random access preamble groups that is sent by the first base station, where the configuration of the N random access preamble groups is carried in one or more of the following kinds of signaling: radio resource control (RRC) common signaling, RRC dedicated signaling, media access control (MAC) control element (CE) signaling, and physical-layer signaling; or configuration of the N random access preamble groups is predetermined.

The configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

Optionally, the transmission unit is further configured to, before the first information that corresponds to the rank of the channel loss extent of the UE is sent to the first base station, receive the transmission type of the first information, where the transmission type of the first information is sent by the first base station and the transmission type of the first information is carried in one or more of the following kinds of signaling: RRC common signaling, RRC dedicated signaling, MAC CE signaling, and physical-layer signaling; or the transmission type of the first information is predefined.

Preferably, in the case in which the UE sends the first information according to the transmission type corresponding to the rank of the channel loss extent of the UE, time and/or frequency resource locations of enhanced random access opportunities corresponding to different transmission types of the first information do not overlap each other.

Preferably, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

Preferably, the transmission type of the first information includes one or more of the following kinds: a spreading sequence index, a random access preamble format, and power configuration, where the transmission type of the first information corresponds to the rank of the channel loss extent.

Optionally, the transmission unit is further configured to, before the first information that corresponds to the rank of the channel loss extent of the UE is sent to the first base station, receive classification information about classifying channel loss extents into N ranks, where the classification information is sent by the first base station and the classification information is carried in one or more of the following kinds of signaling: RRC common signaling, RRC dedicated signaling, MAC CE signaling, and physical-layer signaling; or N ranks of channel loss extents are determined according to a predefined rule.

Optionally, the classification information includes: a parameter that is used to indicate a value of N and/or a threshold parameter that is used to determine the N ranks.

Preferably, the transmission unit is configured to send the first information to the first base station via a neighboring base station, where the neighboring base station is a serving base station of the UE; and/or the transmission unit is configured to send the first information to the first base station, so that the first base station sends the first information or the determined rank of the channel loss extent of the UE to a neighboring base station.

Optionally, the transmission unit is further configured to, after the first information is sent to the first base station via the neighboring base station, receive random access preamble information configured by the first base station; and send a random access preamble to the first base station according to configuration of the random access preamble information.

Optionally, the transmission unit is further configured to, after the first information is sent to the first base station, so that the first base station sends the first information or the determined rank of the channel loss extent of the UE to the neighboring base station, receive random access preamble information configured by the neighboring base station; and send a random access preamble to the neighboring base station according to configuration of the random access preamble information.

Preferably, the random access preamble information includes one or more of the following kinds of parameters: a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

Optionally, the transmission unit is further configured to, after the detection unit 1002 detects the channel loss extent of the UE, send and/or receive third information according to a transmission type of the third information, where the transmission type of the third information corresponds to the rank of the channel loss extent of the UE.

Optionally, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

Preferably, transmission types of at least two kinds of third information are different; or all kinds of third information have a same transmission type.

The transmission unit is further configured to, before the third information is transmitted, receive the transmission type of the third information, where the transmission type of the third information is sent by the first base station and the transmission type of the third information is carried in one or more of the following kinds of signaling: RRC common signaling, RRC dedicated signaling, MAC CE signaling, and physical-layer signaling; or the transmission type of the third information is predetermined; or the transmission unit is further configured to, before the third information is transmitted, receive a random access response message and/or a contention resolution message sent by the first base station, where the random access response message and/or the contention resolution message carries the transmission type of the third information.

Preferably, the transmission type of the third information includes a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

Preferably, the transmission type of the third information further includes one or more of the following kinds: a spreading sequence index, the number of occupied physical resource blocks (PRB), a control channel element (CCE) or enhanced control channel element (eCCE) aggregation level or rank, a modulation and coding scheme, and power configuration, where the transmission type of the third information corresponds to the rank of the channel loss extent.

Preferably, the detection unit is further configured to combine the third information according to the repeating factor K that corresponds to the transmission type of the third information, and detect the combined third information; or despread the third information according to the spreading factor K that corresponds to the transmission type of the third information, and detect the despread third information.

Preferably, the transmission unit is further configured to send a response message for the random access response message to the first base station, where the response message for the random access response message includes one or more of the following kinds: a service type, a service characteristic, a category, and dedicated discontinuous reception (DRX) configuration information of the UE; or the transmission unit is further configured to send a random access preamble to the first base station, where the random access preamble indicates one or more of the following kinds: a service type, a service characteristic, a category, and dedicated discontinuous reception DRX configuration information of the UE.

Optionally, the channel loss includes: path loss between the UE and the first base station, reference signal received power (RSRP), reference signal received quality (RSRQ), or channel quality information (CQI); or path loss between the UE and the neighboring base station, RSRP, RSRQ, or CQI.

Figure 12:
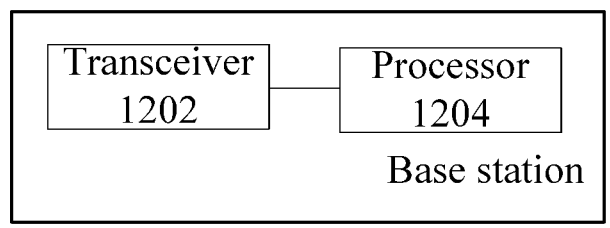
FIG. 12 is a structural block diagram of another base station according to an embodiment of the present application.

An embodiment of the present application further provides a base station, where the base station is configured to implement the foregoing method. As shown in FIG. 12, the base station includes: a transceiver 1202, configured to transmit and receive a signal; and a processor 1204, configured to perform the following steps: controlling the transceiver to receive first information that is from a first user equipment (UE) and corresponds to a rank of a channel loss extent of the first UE; and determining the rank of the channel loss extent of the first UE according to the first information.

Preferably, the processor is configured to control, in the following manner, the transceiver to receive the first information that is from the first user equipment (UE) and corresponds to the rank of the channel loss extent of the first UE:

receiving the first information according to correspondence between the rank of the channel loss extent and a transmission type of the first information.

Preferably, the first information is a random access preamble, and the processor is configured to determine the rank of the channel loss extent of the first UE according to the first information in the following manner:

determining a random access preamble group in which the first information is located, and determining the rank of the channel loss extent of the first UE according to correspondence between the random access preamble group and the rank of the channel loss extent; or determining the rank of the channel loss extent of the first UE according to correspondence between the transmission type of the first information and the rank of the channel loss extent.

Preferably, the random access preamble is a random access preamble in a random access preamble group among N random access preamble groups that are determined for the first UE, where N is a positive integer, and all random access preambles included in the N random access preamble groups are random access preambles all used for contention; or the first UE is a machine type communications (MTC) UE, and all random access preambles included in the N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

Preferably, that all random access preambles included in the N random access preamble groups are random access preambles all used for contention includes that:

one random access preamble group among the N random access preamble groups includes all random access preambles in the random access preamble group A and the random access preamble group B; or one random access preamble group among the N random access preamble groups is the random access preamble group A, and another random access preamble group is the random access preamble group B.

Preferably, the processor controls the transceiver to inform, before the first information that is from the first user equipment (UE) and corresponds to the rank of the channel loss extent of the first UE is received, the first UE of configuration of the N random access preamble groups by using one or more of the following kinds of signaling: radio resource control (RRC) common signaling, RRC dedicated signaling, media access control (MAC) control element (CE) signaling, and physical-layer signaling; or configuration of the N random access preamble groups is predetermined.

The configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

Preferably, the processor controls the transceiver to inform, before the first information that is from the first user equipment (UE) and corresponds to the rank of the channel loss extent of the first UE is received, the first UE of the transmission type of the first information by using one or more of the following kinds of signaling: RRC common signaling, RRC dedicated signaling, MAC CE signaling, and physical-layer signaling; or the transmission type of the first information is predefined.

Preferably, in the case in which the rank of the channel loss extent of the first UE is determined according to the correspondence between the transmission type of the first information and the rank of the channel loss extent, time and/or frequency resource locations of enhanced random access opportunities corresponding to different transmission types of the first information do not overlap each other.

Preferably, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

Preferably, the transmission type of the first information includes one or more of the following kinds: a spreading sequence index, a random access preamble format, and power configuration, where the transmission type of the first information corresponds to the rank of the channel loss extent.

Preferably, after the first information is received, the processor combines the first information according to the repeating factor M that corresponds to the transmission type of the first information, and detects the combined first information by using a sequence in a predetermined set; or despreads the first information according to the spreading factor M that corresponds to the transmission type of the first information, and detects the despread first information by using a sequence in a predetermined set.

Preferably, the processor controls the transceiver to inform, before the first information that is from the first user equipment (UE) and corresponds to the rank of the channel loss extent of the first UE is received, by using one or more of the following kinds of signaling: RRC common signaling, RRC dedicated signaling, MAC CE signaling, and physical-layer signaling, the first UE of classification information about classifying channel loss extents into N ranks; or
  N ranks of channel loss extents are determined according to a predefined rule.

Preferably, the classification information includes: a parameter that is used to indicate a value of N and/or a threshold parameter that is used to determine the N ranks.

Preferably, the processor is configured to control, in the following manner, the transceiver to receive the first information that is from the first user equipment (UE) and corresponds to the rank of the channel loss extent of the first UE: receiving the first information that is from the first UE and is conveyed by a neighboring base station, where the neighboring base station is a serving base station of the first UE; and/or
  the processor controls the transceiver to send, after the first information that is from the first user equipment (UE) and corresponds to the rank of the channel loss extent of the first UE is received, the first information or the determined rank of the channel loss extent of the first UE to a neighboring base station.

Preferably, the processor is configured to, after controlling the transceiver to receive the first information that is from the first UE and is conveyed by the neighboring base station, perform the following steps:
  determining the rank of the channel loss extent of the first UE according to the first information, and configuring random access preamble information corresponding to the rank of the channel loss extent of the first UE;
  controlling the transceiver to inform the neighboring base station of the configured random access preamble information, so that the neighboring base station sends the configured random access preamble information to the first UE; and
  controlling the transceiver to receive a random access preamble that is sent by the first UE and indicated by the configured random access preamble information.

Preferably, the processor is configured to, after controlling the transceiver to send the first information or the determined rank of the channel loss extent of the first UE to the neighboring base station, perform the following steps:
  controlling the transceiver to receive random access preamble information sent by the neighboring base station; and
  controlling the transceiver to send the received random access preamble information to the first UE.

Preferably, the random access preamble information includes one or more of the following kinds of parameters: a parameter for indicating a dedicated random access preamble, a parameter for indicating a factor repeating or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

Preferably, the processor is configured to, after controlling the transceiver to receive the random access preamble that is sent by the first UE and indicated by the configured random access preamble information, perform the following step:
  combining the random access preamble according to the repeating factor M, and detecting the combined random access preamble; or
  despreading the random access preamble according to the spreading factor M, and detecting the despread random access preamble.

Preferably, the processor is configured to, after the rank of the channel loss extent of the first UE is determined according to the first information, control the transceiver to send and/or receive third information according to a transmission type of the third information, where the transmission type of the third information corresponds to the determined rank of the channel loss extent of the first UE.

Preferably, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

Preferably, transmission types of at least two kinds of third information are different; or all kinds of third information have a same transmission type.

Preferably, the processor controls the transceiver to inform, before the third information is transmitted, the first UE of the transmission type of the third information by using one or more of the following kinds of signaling: radio resource control (RRC) common signaling, RRC dedicated signaling, media access control (MAC) control element (CE) signaling, and physical-layer signaling; or
  the transmission type of the third information is predetermined; or
  the processor controls the transceiver to send, before the third information is transmitted, the transmission type of the third information to the first UE by using a random access response message and/or a contention resolution message.

Preferably, the transmission type of the third information includes a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

Preferably, the transmission type of the third information further includes one or more of the following kinds: a spreading sequence index, the number of occupied physical resource blocks (PRB), a control channel element (CCE) or enhanced control channel element (eCCE) aggregation level or rank, a modulation and coding scheme, and power configuration, where the transmission type of the third information corresponds to the rank of the channel loss extent.

Preferably, the processor is configured to, after controlling the transceiver to receive the third information according to the transmission type of the third information, where the transmission type of the third information corresponds to the determined rank of the channel loss extent of the first UE, perform the following step:
  combining the third information according to the repeating factor K that corresponds to the transmission type of the third information, and detecting the combined third information; or
  despreading the third information according to the spreading factor K that corresponds to the transmission type of the third information, and detecting the despread third information.

Preferably, the processor controls the transceiver to receive a response message for the random access response message, where the response message for the random access response message includes one or more of the following kinds: a service type, a service characteristic, a category, and dedicated discontinuous reception (DRX) configuration information of the first UE; or
  the processor controls the transceiver to receive a random access preamble, where the random access preamble indicates one or more of the following kinds: a service type, a service characteristic, a category, and dedicated discontinuous reception (DRX) configuration information of the first UE.

Preferably, the channel loss includes: path loss between the first UE and the serving base station of the first UE, reference signal received power (RSRP), reference signal received quality (RSRQ), or channel quality information (CQI); or path loss between the first UE and the neighboring base station, RSRP, RSRQ, or CQI.

Figure 13:
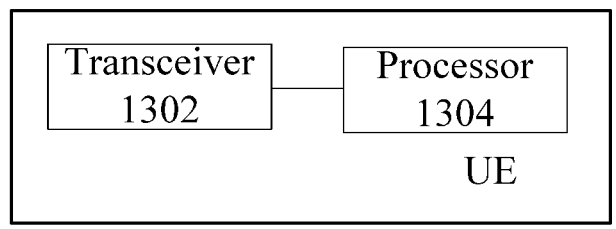
FIG. 13 is a structural block diagram of another UE according to an embodiment of the present application.

An embodiment of the present application further provides a UE, where the UE is used to implement the foregoing method. As shown in FIG. 13, the UE includes: a transceiver 1302, configured to transmit and receive a signal; and a processor 1304, coupled to the transceiver 1302 and configured to perform the following steps: detecting a channel loss extent of the UE; and controlling the transceiver to send first information that corresponds to a rank of the channel loss extent of the UE to a first base station, so that the first base station determines the rank of the channel loss extent of the UE according to the first information.

Preferably, correspondence exists between the rank of the channel loss extent of the UE and a transmission type of the first information.

Preferably, the first information is a random access preamble, and the processor selects, before controlling the transceiver to send the first information that corresponds to the rank of the channel loss extent of the UE to the first base station, a random access preamble from a random access preamble group that corresponds to the rank of the channel loss extent of the UE; or
  the first information is a random access preamble, and the processor controls, in the following manner, the transceiver to send the first information that corresponds to the rank of the channel loss extent of the UE to the first base station: sending the first information according to a transmission type corresponding to the rank of the channel loss extent of the UE.

Preferably, the random access preamble is a random access preamble in a random access preamble group among N random access preamble groups that are determined for the UE, where N is a positive integer, and
  all random access preambles included in the N random access preamble groups are random access preambles all used for contention; or
  the UE is an MTC UE, and all random access preambles included in N random access preamble groups are all random access preambles among random access preambles all used for contention except random access preambles in a random access preamble group A and a random access preamble group B, where the random access preamble group A and the random access preamble group B are sets of preambles that are used for contention-based random access by a UE except the MTC UE.

Preferably, that all random access preambles included in the N random access preamble groups are random access preambles all used for contention includes:
  one random access preamble group among the N random access preamble groups includes all random access preambles in the random access preamble group A and the random access preamble group B; or
  one random access preamble group among the N random access preamble groups is the random access preamble group A, and another random access preamble group is the random access preamble group B.

Preferably, the processor controls the transceiver to receive, before the first information that corresponds to the rank of the channel loss extent of the UE is sent to the first base station, configuration of the N random access preamble groups that is sent by the first base station, where the configuration of the N random access preamble groups is carried in one or more of the following kinds of signaling: radio resource control (RRC) common signaling, RRC dedicated signaling, media access control (MAC) control element (CE) signaling, and physical-layer signaling; or configuration of the N random access preamble groups is predetermined.

The configuration of the N random access preamble groups includes one or more of the following kinds of parameters: a parameter that is used to indicate the number of all random access preambles used for contention, a parameter that is used to indicate a value of N, a parameter that is used to indicate the number of random access preambles included in each random access preamble group, a parameter that is used to indicate an index of a starting random access preamble in a first random access preamble group, and a parameter that is used to indicate an index of a starting random access preamble in each random access preamble group.

Preferably, the processor controls the transceiver to receive, before the first information that corresponds to the rank of the channel loss extent of the UE is sent to the first base station, the transmission type of the first information, where the transmission type of the first information is sent by the first base station and the transmission type of the first information is carried in one or more of the following kinds of signaling: RRC common signaling, RRC dedicated signaling, MAC CE signaling, and physical-layer signaling; or
  the transmission type of the first information is predefined.

Preferably, in the case in which the UE sends the first information according to the transmission type corresponding to the rank of the channel loss extent of the UE, time and/or frequency resource locations of enhanced random access opportunities corresponding to different transmission types of the first information do not overlap each other.

Preferably, the transmission type of the first information includes a repeating factor or spreading factor M of a random access preamble in an enhanced random access opportunity, where the transmission type of the first information corresponds to the rank of the channel loss extent, M is a positive integer, and the enhanced random access opportunity embodies a time and/or frequency resource location of a repeated or spread random access preamble.

Preferably, the transmission type of the first information includes one or more of the following kinds: a spreading sequence index, a random access preamble format, and power configuration, where the transmission type of the first information corresponds to the rank of the channel loss extent.

Preferably, the processor controls the transceiver to receive, before the first information that corresponds to the rank of the channel loss extent of the UE is sent to the first base station, classification information about classifying channel loss extents into N ranks, where the classification information is sent by the first base station and the classification information is carried in one or more of the following kinds of signaling: RRC common signaling, RRC dedicated signaling, MAC CE signaling, and physical-layer signaling; or
  N ranks of channel loss extents are determined according to a predefined rule.

Preferably, the classification information includes: a parameter that is used to indicate a value of N and/or a threshold parameter that is used to determine the N ranks.

Preferably, the processor controls, in the following manner, the transceiver to send the first information that corresponds to the rank of the channel loss extent of the UE to the first base station: sending the first information to the first base station via a neighboring base station, where the neighboring base station is a serving base station of the UE; and/or
  the processor controls, in the following manner, the transceiver to send the first information that corresponds to the rank of the channel loss extent of the UE to the first base station: sending the first information to the first base station, so that the first base station sends the first information or the determined rank of the channel loss extent of the UE to a neighboring base station.

Preferably, the processor controls the transceiver to receive, after the first information is sent to the first base station via the neighboring base station, random access preamble information configured by the first base station; and send a random access preamble to the first base station according to configuration of the random access preamble information.

Preferably, the processor controls the transceiver to receive, after the first information is sent to the first base station, so that the first base station sends the first information or the determined rank of the channel loss extent of the UE to the neighboring base station, random access preamble information configured by the neighboring base station; and send a random access preamble to the neighboring base station according to configuration of the random access preamble information.

Preferably, the random access preamble information includes one or more of the following kinds of parameters: a parameter for indicating a dedicated random access preamble, a parameter for indicating a repeating factor or spreading factor M of a random access preamble in an enhanced random access opportunity, a parameter for indicating an enhanced random access opportunity, and a parameter for indicating a size of a time window that includes one or more enhanced random access opportunities, where the enhanced random access opportunity embodies a time and/or frequency resource location of a repeated or spread random access preamble.

Preferably, the processor controls the transceiver to send and/or receive, after the the processor 1304 detects the channel loss extent of the UE, third information according to a transmission type of the third information, where the transmission type of the third information corresponds to the rank of the channel loss extent of the UE.

Preferably, the third information includes at least one of the following: a physical downlink control channel (PDCCH), an enhanced physical downlink control channel (ePDCCH), a random access response message, a contention resolution message, system information, a physical control format indicator channel (PCFICH), a physical hybrid automatic repeat request indicator channel (PHICH), a unicast physical downlink shared channel (PDSCH), a broadcast or multicast physical downlink shared channel (PDSCH), a physical uplink shared channel (PUSCH), a physical uplink control channel (PUCCH), a common reference signal (CRS), a demodulation reference signal (DMRS), a dedicated reference signal (DRS), a synchronization channel (SCH), and a physical broadcast channel (PBCH).

Preferably, transmission types of at least two kinds of third information are different; or all kinds of third information have a same transmission type.

Preferably, the processor controls the transceiver to receive, before the third information is transmitted, the transmission type of the third information, where the transmission type of the third information is sent by the first base station and the transmission type of the third information is carried in one or more of the following kinds of signaling: RRC common signaling, RRC dedicated signaling, MAC CE signaling, and physical-layer signaling; or
  the transmission type of the third information is predetermined; or
  the processor controls the transceiver to receive, before the third information is transmitted, a random access response message and/or a contention resolution message sent by the first base station, where the random access response message and/or the contention resolution message carries the transmission type of the third information.

Preferably, the transmission type of the third information includes: a repeating factor or spreading factor K of the third information that is sent or received in a transmission opportunity of the third information, where the transmission type of the third information corresponds to the rank of the channel loss extent, K is a positive integer, and the transmission opportunity of the third information embodies a location of a time and/or frequency resource for sending or receiving the third information.

Preferably, the transmission type of the third information further includes one or more of the following kinds: a spreading sequence index, the number of occupied physical resource blocks (PRB), a control channel element (CCE) or enhanced control channel element (eCCE) aggregation level or rank, a modulation and coding scheme, and power configuration, where the transmission type of the third information corresponds to the rank of the channel loss extent.

Preferably, the processor is configured to, after controlling the transceiver to receive the third information according to the transmission type of the third information, where the transmission type of the third information corresponds to the rank of the channel loss extent of the UE, perform the following step:

combining the third information according to the repeating factor K that corresponds to the transmission type of the third information, and detecting the combined third information; or despreading the third information according to the spreading factor K that corresponds to the transmission type of the third information, and detecting the despread third information.

Preferably, the processor controls the transceiver to send a response message for the random access response message to the first base station, where the response message for the random access response message includes one or more of the following kinds: a service type, a service characteristic, a category, and dedicated discontinuous reception DRX configuration information of the UE; or the processor controls the transceiver to send a random access preamble to the first base station, where the random access preamble indicates one or more of the following kinds: a service type, a service characteristic, a category, and dedicated discontinuous reception (DRX) configuration information of the UE.

Preferably, the channel loss includes: path loss between the UE and the first base station, reference signal received power (RSRP), reference signal received quality (RSRQ), or channel quality information (CQI); or path loss between the UE and the neighboring base station, RSRP, RSRQ, or CQI.

The processor in the embodiment of the present application may be an integrated circuit chip having a signal processing capability or may be a hardware processor such as a central processing unit (CPU). During implementation, each step of the foregoing methods can be completed by integrated logic circuits of hardware in the processor or instructions in the form of software. These instructions may cooperate with each other through the processor for implementation and control. The foregoing processor, configured to perform the methods disclosed in the embodiments of the present application, may be a general processor, a digital signal processor (DSP), an application specific integrated circuit (ASIC), a field programmable gate array (FPGA) or another programmable logic device, a discrete gate or transistor logic device, or a discrete hardware component. The processor can implement or perform each method, step, and logic block diagram disclosed in the embodiments of the present application. The general processor may be a micro processor or the processor may be any conventional processor, decoder, or the like. The steps of the methods disclosed with reference to the embodiments of the present application may be directly performed and completed by a hardware processor, or performed and completed by a combination of hardware and a software module in the processor. The software module may be located in a mature storage medium in this field, such as a random memory, a flash memory, a read-only memory, a programmable read-only memory or an electrically erasable programmable memory, and a register.

Through the descriptions of the foregoing embodiments, a person skilled in the art may be clearly aware that the present application may be implemented through hardware, or firmware, or a combination thereof. When the present application is implemented by using software, the foregoing functions may be stored in a computer readable medium, or transmitted as one or more instructions or codes on a computer readable medium. The computer readable medium includes a computer storage medium and a communications medium, where the communications medium includes any medium that facilitates transmission of a computer program from one place to another place. The storage medium may be any available medium accessible to a computer. The following is used as an example but is not limited to: The computer readable medium may include a random access memory (RAM), a read-only memory (ROM), an electrically erasable programmable read-only memory (EEPROM), a compact disc read-only memory (CD-ROM) or another optical disc storage device, a disk storage medium or another disk storage device, or any other medium that can be used to carry or store expected a program code in a command or data structure form and can be accessed by a computer. In addition, any connection may appropriately serve as a computer readable medium. For example, if software implements transmission from a website, a server, or other remote sources by using a coaxial cable, an optical cable, a twisted pair, a digital subscriber line (DSL), or a wireless technology such as infrared, radio, or microwave, the coaxial cable, the optical cable, the twisted pair, the DSL, or the wireless technology such as infrared, radio, or microwave is included in fixation of a home medium. For example, a disk or a disc used in the present application includes a compact disc (CD), a laser disc, an optical disc, a digital versatile disk (DVD), a floppy disk, and a blue-ray disc. Generally, a disk magnetically duplicates data, while a disc optically duplicates data by using laser. A combination of the foregoing should also be included in the protection scope of the computer readable medium.

In conclusion, the foregoing descriptions are only exemplary embodiments of the technical solutions of the present application but are not intended to limit the protection scope of the present application. Any modification, equivalent replacement, or improvement made within the principle of the present application shall all fall within the protection scope of the present application.

What is claimed is:

1. A non-transitory computer-readable medium storing instructions which, when executed by a processor in a network device, cause the network device to:

send radio resource control common signaling to a terminal device, wherein the radio resource control common signaling indicates that there are N ranks of channel loss extent, each rank has a corresponding number of random access preamble repetitions, and N≥1;

receive, in an enhanced random access opportunity, from the terminal device, one or more transmissions of a random access preamble in a first number of repetitions of the random access preamble, wherein the enhanced random access opportunity embodies a time and/or frequency resource location of a repeated random access preamble; and determine a rank of the channel loss extent according to the received random access preamble;

wherein a channel loss is a reference signal received power (RSRP).

2. The non-transitory computer-readable medium according to claim 1, wherein in determining the rank of channel loss extent according to the received random access preamble, the instructions cause the network device to:

determine a random access preamble group in which the received random access preamble is located; and determine the rank of channel loss extent according to a correspondence between the random access preamble group and the rank of channel loss extent.

3. The non-transitory computer-readable medium according to claim 1, wherein in determining the rank of channel loss extent according to the received random access preamble, the instructions cause the network device to:

determine the rank of channel loss extent according to a correspondence between the first number of repetitions of the received random access preamble and the rank of channel loss extent.

4. The non-transitory computer-readable medium according to claim 1, wherein the random access preamble group is one of N random access preamble groups that are determined for the terminal device, and wherein all random access preambles comprised in the N random access preamble groups are used for contention.

5. The non-transitory computer-readable medium according to claim 1, wherein the terminal device is a machine type communications (MTC) terminal;

wherein the random access preamble group is one of N random access preamble groups that are determined for the terminal device;

wherein all random access preambles comprised in the N random access preamble groups, except in a random access preamble group A and a random access preamble group B, are used for contention; and wherein random access preambles in the random access preamble group A and the random access preamble group B are used for contention-based random access by a terminal device that is not a MTC terminal.

6. The non-transitory computer-readable medium according to claim 1, wherein the radio resource control common signaling comprises one or both of the following:

a parameter that is used to indicate the value of N;

a threshold parameter that is used by the terminal device to determine the N ranks.

7. The non-transitory computer-readable medium according to claim 1, further storing instructions which, when executed by the processor in the network device, cause the network device to:

after determining the rank of channel loss extent, determine a second number of repetitions corresponding to the determined rank of channel loss extent;

wherein the second number of repetitions is for sending downlink information.

8. The non-transitory computer-readable medium according to claim 7, wherein the downlink information is carried in at least one of the following:

a physical downlink control channel, a random access response message, a contention resolution message, or a unicast physical downlink shared channel.

9. The non-transitory computer-readable medium according to claim 1, further storing instructions which, when executed by the processor of the network device, cause the network device to:

after determining the rank of channel loss extent, determine a second number of repetitions corresponding to the determined rank of channel loss extent;

wherein the second number of repetitions is for receiving uplink information.

10. The non-transitory computer-readable medium according to claim 9, wherein the uplink information is carried in a physical uplink shared channel, or a physical uplink control channel.

11. A non-transitory computer-readable medium storing instructions which, when executed by a processor in a terminal device, cause the terminal device to:

receive a radio resource control common signaling from a network device, wherein the radio resource control common signaling indicates that there are N ranks of channel loss extent, each rank has a corresponding number of random access preamble repetitions, and $N \geq 1$;

determine the rank of channel loss extent according to a reference signal received power (RSRP);

determine a first number of repetitions of a random access preamble in an enhanced random access opportunity corresponding to the rank of channel loss extent, wherein the enhanced random access opportunity embodies a time and/or frequency resource location of a repeated random access preamble;

send the random access preamble according to the determined first number of repetitions of the random access preamble to the network device.

12. The non-transitory computer-readable medium according to claim 11, further storing instructions which, when executed by the processor of the terminal device, cause the terminal device to:

select the random access preamble from a random access preamble group that corresponds to the rank of the channel loss extent.

13. The non-transitory computer-readable medium according to claim 11, wherein the random access preamble group is one of N random access preamble groups that are determined for the terminal device, and wherein all random access preambles comprised in the N random access preamble groups are used for contention.

14. The non-transitory computer-readable medium according to claim 11, wherein the terminal device is a machine type communications (MTC) terminal;

wherein the random access preamble group is one of N random access preamble groups that are determined for the terminal device;

wherein all random access preambles comprised in the N random access preamble groups, except in a random access preamble group A and a random access preamble group B, are used for contention; and wherein random access preambles in the random access preamble group A and the random access preamble group B are used for contention-based random access by a terminal device that is not a MTC terminal.

15. The non-transitory computer-readable medium according to claim 11, wherein the radio resource control common signaling comprises one or both of the following:

a parameter that is used to indicate the value of N;

a threshold parameter that is used by the terminal device to determine the N ranks.

16. The non-transitory computer-readable medium according to claim 11, further storing instructions which, when executed by the processor of the terminal device, cause the terminal device to:

after determining the rank of channel loss extent, determine a second number of repetitions corresponding to the determined rank of channel loss extent, wherein the second number of repetitions is for the transceiver to receiving downlink.

17. The non-transitory computer-readable medium according to claim 16, wherein the downlink information is carried in at least one of the following:
- a physical downlink control channel,
- a random access response message,
- a contention resolution message, or
- a unicast physical downlink shared channel.

18. The non-transitory computer-readable medium according to claim 11, further storing instructions which, when executed by the processor of the terminal device, cause the terminal device to:
- after determining the rank of channel loss extent, determine a second number of repetitions corresponding to the determined rank of channel loss extent;
- wherein the second number of repetitions is for sending uplink information.

19. The non-transitory computer-readable medium according to claim 18, wherein the uplink information is carried in a physical uplink shared channel, or a physical uplink control channel.

* * * * *

UNITED STATES PATENT AND TRADEMARK OFFICE
CERTIFICATE OF CORRECTION

| | | |
|---|---|---|
| PATENT NO. | : 10,904,120 B2 | Page 1 of 1 |
| APPLICATION NO. | : 16/586991 | |
| DATED | : January 26, 2021 | |
| INVENTOR(S) | : Yu et al. | |

It is certified that error appears in the above-identified patent and that said Letters Patent is hereby corrected as shown below:

On the Title Page

In Item (71) under "Applicant", Column 1, Line 2, after "Ltd." insert -- Shenzhen -- prior to "Guangdong (CN)".

In the Specification

In Column 62, Line 14, rewrite "the the processor" as -- the processor --.

Signed and Sealed this
Fourth Day of October, 2022

Katherine Kelly Vidal
*Director of the United States Patent and Trademark Office*